(12) United States Patent
Orion et al.

(10) Patent No.: US 11,586,944 B2
(45) Date of Patent: Feb. 21, 2023

(54) ALLOCATION FILTER FOR PREDICTION STORAGE STRUCTURE

(71) Applicant: Arm Limited, Cambridge (GB)

(72) Inventors: Luc Orion, Mouans Sartoux (FR); Houdhaifa Bouzguarrou, Valbonne (FR); Guillaume Bolbenes, Antibes (FR); Eddy Lapeyre, Antibes (FR)

(73) Assignee: Arm Limited, Cambridge (GB)

( * ) Notice: Subject to any disclaimer, the term of this patent is extended or adjusted under 35 U.S.C. 154(b) by 763 days.

(21) Appl. No.: 16/541,531

(22) Filed: Aug. 15, 2019

(65) Prior Publication Data

US 2020/0082280 A1 Mar. 12, 2020

(30) Foreign Application Priority Data

Sep. 11, 2018 (GB) ...................................... 1814729

(51) Int. Cl.
*G06F 12/0862* (2016.01)
*G06N 5/04* (2023.01)
(Continued)

(52) U.S. Cl.
CPC ........... *G06N 5/04* (2013.01); *G06F 12/0862* (2013.01); *G06N 5/003* (2013.01); *G06N 20/00* (2019.01); *G06F 2212/602* (2013.01)

(58) Field of Classification Search
None
See application file for complete search history.

(56) References Cited

U.S. PATENT DOCUMENTS 5,835,967 A * 11/1998 McMahan ............. G06F 9/3812
712/E9.055
6,571,318 B1 * 5/2003 Sander ................ G06F 12/0862
711/204
(Continued)

FOREIGN PATENT DOCUMENTS

GB 2539189 12/2016

OTHER PUBLICATIONS

Combined Search and Examination Report for GB1814729.8 dated Mar. 11, 2019, 7 pages.
(Continued)

*Primary Examiner* — Brian R Peugh
(74) *Attorney, Agent, or Firm* — Nixon & Vanderhye P.C.

(57) ABSTRACT

An apparatus comprises: a prediction storage structure comprising a plurality of prediction state entries representing instances of predicted instruction behaviour; prediction training circuitry to perform a training operation to train the prediction state entries based on actual instruction behaviour; prediction circuitry to output at least one control signal for triggering a speculative operation based on the predicted instruction behaviour represented by a prediction state entry for which the training operation has provided sufficient confidence in the predicted instruction behaviour; an allocation filter comprising at least one allocation filter entry representing a failed predicted instruction behaviour for which the training operation failed to provide said sufficient confidence; and prediction allocation circuitry to prevent allocation of a new entry in the prediction storage structure for a failed predicted instruction behaviour represented by an allocation filter entry of the allocation filter.

15 Claims, 12 Drawing Sheets

(51) Int. Cl.
*G06N 5/00* (2023.01)
*G06N 20/00* (2019.01)

(56) References Cited

U.S. PATENT DOCUMENTS

| | | |
|---|---|---|
| 2007/0239974 A1 | 10/2007 | Park et al. |
| 2008/0120496 A1 | 5/2008 | Bradford et al. |
| 2013/0311760 A1 | 11/2013 | Kothari et al. |
| 2016/0026470 A1* | 1/2016 | Manoukian ........... G06F 9/3848 712/240 |

OTHER PUBLICATIONS

Office Action for GB Application No. 1814729.8 dated Oct. 29, 2020, 2 pages.

* cited by examiner

| V | tag value | replacement policy | termination outcome | trip count | arch count | spec count | training phase ? | confidence | unreliable indication |
|---|---|---|---|---|---|---|---|---|---|
| 72 | 74 | 76 | 78 | 80 | 82 | 84 | 86 | 88 | 90 |
| | | | ....... | | | | | | |

FIG. 5 stride address prediction structure:

allocation filter:

entries prohibited from allocation to stride address prediction structure, identified by one or more of:

- prohibited instruction address region

- prohibited target address region

- prohibited stride offset

ALLOCATION FILTER FOR PREDICTION STORAGE STRUCTURE

This application claims priority to GB Patent Application No. 1814729.8 filed Sep. 11, 2018, the entire contents of which are hereby incorporated by reference.

The present technique relates to the field of data processing.

A data processing system may include a prediction storage structure to store information indicating predicted instruction behaviour. The contents of the prediction storage structure can be trained based on actual instruction behaviour of instructions processed by processing circuitry, and based on the information stored, a predicted instruction behaviour may be determined and this may be used to trigger a processing system component to perform a speculative operation. An example of such prediction storage structure may be in a branch predictor which uses information derived from the outcomes of previous branch instructions to predict whether branch instructions are likely to be taken or not taken. This can enable fetching, decoding and executing of instructions following a branch to be performed earlier than if the fetch had to be delayed until the actual branch outcome was known.

At least some examples provide an apparatus comprising: a prediction storage structure comprising a plurality of prediction state entries representing instances of predicted instruction behaviour; prediction training circuitry to perform a training operation to train the prediction state entries based on actual instruction behaviour of instructions processed by processing circuitry; prediction circuitry to output at least one control signal for triggering a speculative operation based on the predicted instruction behaviour represented by a prediction state entry for which the training operation has provided sufficient confidence in the predicted instruction behaviour; an allocation filter comprising at least one allocation filter entry representing a failed predicted instruction behaviour for which the training operation failed to provide said sufficient confidence; and prediction allocation circuitry to prevent allocation of a new entry in the prediction storage structure for a predicted instruction behaviour corresponding to a failed predicted instruction behaviour represented by one of said at least one allocation filter entry of the allocation filter.

At least some examples provide an apparatus comprising: means for prediction storage, comprising a plurality of prediction state entries representing instances of predicted instruction behaviour; means for performing a training operation to train the prediction state entries based on actual instruction behaviour of instructions processed by processing circuitry; means for outputting at least one control signal for triggering a speculative operation based on the predicted instruction behaviour represented by a prediction state entry for which the training operation has provided sufficient confidence in the predicted instruction behaviour; means for filtering allocation, comprising at least one allocation filter entry representing a failed predicted instruction behaviour for which the training operation failed to provide said sufficient confidence; and means for controlling allocation, to prevent allocation of a new entry in the means for prediction storage for a predicted instruction behaviour corresponding to a failed predicted instruction behaviour represented by one of said at least one allocation filter entry of the means for filtering allocation.

At least some examples provide a method comprising: providing a plurality of prediction state entry in a prediction storage structure, the prediction state entries representing instances of predicted instruction behaviour; performing a training operation to train the prediction state entries based on actual instruction behaviour of instructions processed by processing circuitry; outputting at least one control signal for triggering a speculative operation based on the predicted instruction behaviour represented by a prediction state entry for which the training operation has provided sufficient confidence in the predicted instruction behaviour; providing at least one allocation filter entry representing a failed predicted instruction behaviour for which the training operation failed to provide said sufficient confidence; and preventing allocation of a new entry in the prediction storage structure for a predicted instruction behaviour corresponding to a failed predicted instruction behaviour represented by one of said at least one allocation filter entry.

Further aspects, features and advantages of the present technique will be apparent from the following description of examples, which is to be read in conjunction with the accompanying drawings, in which:

FIG. 1 schematically illustrates an example of a data processing system;

FIG. 5 shows an example of prediction state entries of the loop termination predictor;

Figure 1:
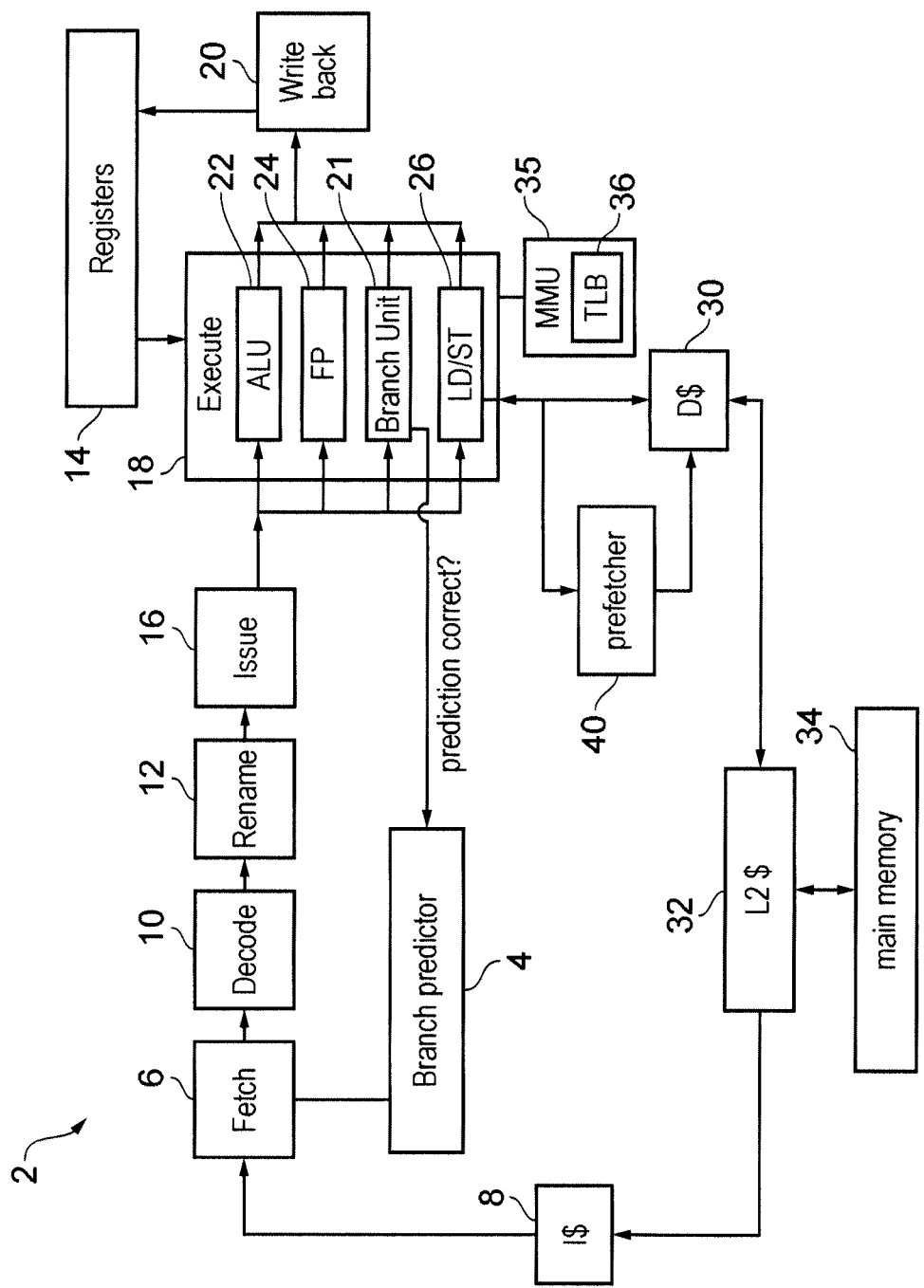

An apparatus has a prediction storage structure comprising a number of prediction state entries representing instances of predicted instruction behaviour. Prediction training circuitry is provided to perform a training operation to train the prediction state entries based on actual instruction behaviour of instructions processed by processing circuitry. Prediction circuitry outputs at least one control signal for triggering a processing system component to perform a speculative operation based on the predicted instruction behaviour represented by a prediction state entry for which the training operation has provided sufficient confidence in the predicted instruction behaviour. Hence, by learning from past behaviour when processing instructions, a prediction of future instruction behaviour can be made before the actual outcome of the instruction is known, and this can allow subsequent operations to be performed speculatively, which when the prediction is correct can help to improve system performance.

The apparatus comprises an allocation filter which comprises at least one allocation filter entry representing a failed predicted instruction behaviour for which the training operation failed to provide the sufficient confidence required in order to use the predicted instruction behaviour for control of speculative operations. The prediction allocation circuitry may prevent allocation of a new entry in the prediction storage structure for a predicted instruction behaviour corresponding to a failed predicted instruction behaviour represented by one of the allocation filter entries of the allocation filter.

It may seem counterintuitive to dedicate circuit resource for storing entries which represent failed predicted instruction behaviours for which the training operation failed to provide enough confidence. One would normally assume that only information about more successful predictions should be stored within a storage structure. However, the inventors recognised that providing an allocation filter to record failed predicted instruction behaviours can improve the efficiency of the prediction storage structure itself by preventing repeated allocations into the prediction storage structure for entries corresponding to failed predicted instruction behaviours which have already been determined in the past to have failed their training operation.

For example, there are maybe some types of prediction storage structure which are used to detect a specific pattern of predicted instruction behaviour which may be relatively uncommon, and so in attempting to train the prediction state to recognise an instance of the desired pattern based on the actual instruction behaviour, this may result in allocation of many entries which end up failing the training operation because the corresponding behaviour turned out not to match the desired pattern. The number of entries for which the training operation fails may be greater than there are entries for which the training operation was successful.

In predictors where there are many more allocations into the prediction structure than there are entries for which the training operation ends up being successful, there can be a problem in that the training period (during which the training operation is performed until sufficient confidence has been reached in the predicted instruction behaviour for a given entry) may be relatively long. As there may be more frequent allocations into the prediction storage structure than cases when the training operation succeeds, if there are insufficient number of entries in the prediction storage structure, this may risk an entry for which the training operation would have been successful if it had continued being evicted to make way for a new entry which may not be successful in its training operation. Hence, in practice prediction storage structures for detecting specific patterns, which are rare in comparison to the number of candidate entries being trained to spot the pattern, may in practice need a relatively large number of prediction state entries so that they can accommodate a number of entries which may end up failing the training operation and retain entries which succeed in the training operation for long enough that they are not evicted before the training operation has reached sufficient confidence.

Hence, without the allocation filter, the prediction storage structure may be relatively large and may have to be provided with a much greater number of entries than the number of entries for which the training operation is actually expected to be successful, simply to accommodate all of the failed entries as well as the successful entries. The training operation itself may be relatively complex and so the overhead of providing additional prediction state entries in the prediction storage structure may be expensive in terms of circuit area and power consumption, as well as in terms of performance when looking up the prediction storage structure since the delays in critical timing paths may depend on the number of prediction state entries provided in the prediction storage structure.

In contrast, by providing an allocation filter to which entries can be allocated to represent a failed predicted instruction behaviour for which the training operation previously was detected to fail, this means that allocation of a new entry in the prediction storage structure for a behaviour already identified as failing the training operation can be prevented, so as to preserve the entries of the prediction storage structure for newly detected instruction behaviours which have not previously been determined to fail the training operation. This avoids polluting the prediction storage structure with entries already known to fail their training, and reduces the risk of an entry of the prediction storage structure which is still undergoing training and could eventually gain sufficient confidence being evicted to make way for a different predicted instruction behaviour which is less likely to succeed in its training operation.

Hence, as the known failed predicted instruction behaviours are prevented from being allocated into the prediction storage structure, this avoids the need to overmargin the number of entries as discussed above, so that for a given prediction success rate, the number of entries in the prediction storage structure can be significantly reduced. Alternatively, for a given number of entries of the prediction storage structure, the prediction success rate can be greater because the use of the allocation filter means that fewer of the entries of the prediction storage structure are wasted in recording instruction behaviours already detected to have failed their training operation in a previous instance of training. Hence, the use of the allocation filter for recording failed predicted instruction behaviours surprisingly increases the overall efficiency of the predictor.

Although the allocation filter may require some additional storage resource to be provided, the improved efficiency of the prediction storage structure and potential reduction in the number of entries required in the prediction storage structure to achieve a given prediction success rate may outweigh the added cost of the allocation filter. In any case, the entries of the allocation filter may be less complex than those of the prediction storage structure itself as in each entry of the allocation filter it may not be necessary to fully represent the information included in an entry of the prediction storage structure (e.g. in some examples the allocation filter may not need to include speculatively updated information which is predicted but not yet confirmed by execution). In practice the power consumed per entry of the allocation filter may be less than the power consumed by the prediction storage structure, since the allocation filter may only need to be looked up when there is a potential new entry to allocate into the prediction storage structure, whereas the prediction storage structure itself may be looked up for each prediction made. Hence, in the provision of the allocation filter does not require a great amount of additional circuit area and power cost, and enables overall circuit area and power saving by enabling a reduction of the number of prediction state entries of the main prediction storage structure for a given level of prediction performance.

In response to identifying, in the actual instruction behaviour, a candidate instruction behaviour identified as a candidate for training, for which the candidate instruction behaviour misses in both the prediction storage structure and the allocation filter, the prediction allocation circuitry may allocate a new entry in the prediction storage structure for the candidate instruction behaviour. Hence, when a candidate for training is identified, the prediction allocation circuitry may look up the allocation filter and if the allocation filter already records that candidate instruction behaviour as a failed predicted instruction behaviour, then no allocation into the prediction storage structure is made. The allocation into the prediction storage structure may only occur when the candidate instruction behaviour misses in both the prediction storage structure itself and the allocation filter.

Note that the lookup method to determine whether the allocation filter comprises an allocation filter entry for a given candidate instruction behaviour may be different to the lookup method for the prediction storage structure itself. For example, different indexing schemes or hit computations could be used for the prediction storage structure and allocation filter respectively. In some cases the indexing schemes for the prediction storage structure itself and the allocation filter could differ simply in the address mapping function used to derive the index into the respective storage arrays, for example a different hash function could be used for the allocation filter because the allocation filter may comprise a different number of entries and/or a different associativity compared to the prediction storage structure. In some cases the index for the allocation filter and the index for the prediction storage structure could be derived from the same information about a given instruction behaviour to be predicted, for example a program counter address of a branch instruction. However, in other examples the index for the allocation filter could be derived from totally different information to be indexed to the prediction storage structure itself. For example, if the prediction storage structure is an address predictor used to predict patterns of load target addresses so that a prefetcher can prefetch those addresses into a cache, then in one example the prediction storage structure (address prediction structure) could be looked up based on the load target address identifying the data to be loaded by the load instruction, whereas the allocation filter in some embodiments could be looked up based on different information such as the program instruction address of the load instruction rather than the target address. Hence, it will be appreciated that it is not essential for the allocation filter to use the same indexing or hit computation function as the prediction storage structure.

Entries may be allocated to the allocation filter upon eviction of an entry from the prediction storage structure. For example, in response to eviction of a victim prediction state entry from the prediction storage structure, when the training operation for the victim prediction state entry is determined to have failed to provide sufficient confidence, then the prediction allocation circuitry may allocate a new allocation filter entry in the allocation filter corresponding to the predicted instruction behaviour indicated by the victim prediction state entry. It is not necessary to record all of the information from the victim prediction state entry in the corresponding new allocation filter entry.

In some examples the decision on whether or not to allocate an entry in the allocation filter for a predicted instruction behaviour from a victim prediction state entry may simply be dependent on the confidence indication provided by the victim prediction state entry. The confidence indication may be updated during training based on whether the predicted instruction behaviour matches the actual instruction behaviour. A threshold may be defined for the confidence which may determine whether the confidence is considered sufficient to end the training operation and start using the predicted instruction behaviour for controlling speculative operations. On eviction of an entry from the prediction storage structure, when the evicted entry has the confidence less than a filter threshold (which could be the same or different to the threshold used to determine whether to end the training operation), then a new entry can be allocated to the allocation filter for the behaviour represented by the evicted entry.

The decision on whether or not an evicted entry from the prediction storage structure should be allocated into the allocation filter could also depend on a prediction unreliable indication set for a given prediction state entry when the training operation identifies that the predicted instruction behaviour for the given prediction state entry is unreliable. In this case, in response to eviction of a victim prediction state entry from the prediction storage structure, when the prediction unreliable indication is set for the victim prediction state entry, then the prediction allocation circuitry may allocate a new allocation filter entry in the allocation filter corresponding to the predicted instruction behaviour indicated by the victim prediction state entry. By providing an additional prediction unreliable indication then this may allow the prediction allocation circuitry to distinguish entries which have not reached sufficient confidence simply because there have not yet been enough instances of the behaviour to be able to perform the training operation with a sufficient degree of confidence from other entries for which there has been enough training data to provide sufficient confidence but in fact the results of the training have proved unreliable and so this entry should be identified as a failed prediction instruction behaviour. Hence, in some cases it can be useful to provide a separate unreliable indication from the confidence itself.

For example, the unreliable indication could be set for a given prediction state entry if, after expiry of an age counter for tracking elapse of time (e.g. elapse of a certain period of time, or after a certain number of lookups to the prediction storage structure), the given prediction state entry is still in its training phase. The age counter could be a per-entry counter associated with the given prediction state entry itself, which is initialised on allocation of the given prediction state entry to the prediction state storage, or a global counter shared between entries, which counts global "epochs" with the end of the epoch triggering any prediction state entries still in the training phase to have their unreliable indication set and the global age counter then being reset to start counting the next "epoch". Either way, by marking entries which tend to be resident for a long time without completing training as "unreliable" using the unreliable indication, this means that predicted behaviour which occurs so rarely that there are not enough instances of the behaviour to perform the training operation can be distinguished from shorter lived entries undergoing training, so that on eviction from the prediction storage structure, the long lived entry still undergoing training can be evicted from the prediction storage structure and moved to the allocation filter to reduce the chance that the same infrequently occurring behaviour will be allocated to the prediction state storage in future.

In some implementations, once a given allocation filter entry has been allocated to the allocation filter, it may remain in the allocation filter until it needs to be evicted to make way for another entry when there is no other invalid entry which could be allocated to the new allocation filter entry.

However, in other examples, the prediction allocation circuitry may evict a given allocation filter entry from the allocation filter when the given allocation filter entry meets a retry condition, where the retry condition is some condition other than the allocation filter simply not having enough entries to make space for another allocation filter entry. It can be useful to trigger additional evictions of entries from the allocation filter, because program behaviour may change over time when executing instructions from the program. For example, in some programs, an initial part of the program may experience relatively unstable behaviour, but may eventually settle down so that the behaviour becomes more stable. Hence, a predicted instruction behaviour which was initially determined to be unstable could subsequently become more stable.

Hence it may be desirable to provide a mechanism for evicting entries from the allocation filter so that they can have another chance at undergoing the training within the main prediction storage structure. Hence, the prediction allocation circuitry may determine whether a given allocation filter entry meets a retry condition that indicates that that entry may be suitable for retrying once more in the prediction storage structure, and if the given allocation filter entry meets the retry condition then the prediction allocation circuitry may evict a given allocation filter entry. Optionally, on evicting the given allocation filter entry because it meets the retry condition, the entry could also be allocated into the prediction storage structure, although this is not essential and in other examples an evicted allocation filter entry may simply be discarded and then the next time a candidate for training is identified which corresponds to that evicted allocation filter entry, as that candidate instruction behaviour no longer has a corresponding entry in the allocation filter it may then be allocated into the prediction storage structure.

In one example, the retry condition could comprise the elapse of a predetermined period since a given allocation filter entry was allocated to the allocation filter or since a previous retry condition occurred. For example the predetermined period could comprise at least one of a predetermined amount of time, a predetermined number of lookups to the allocation filter, or a predetermined number of lookups to the allocation filter which hit in the given allocation filter entry, or a combination of these. Hence, there may be an age based criterion for retrying entries from the allocation filter in the prediction storage structure. In some cases the age condition could be tracked separately for each individual allocation filter entry, for example a separate counter could be maintained for each allocation filter entry which tracks the number of hits in that particular allocation filter entry and when the counter reaches a given threshold then the given allocation filter could be evicted. However, this is not essential and in other examples a global tracking of age could be made where a counter records the elapsed period for the allocation filter as a whole, and when the global counter reaches the determined threshold then all of the allocation filter entries could be evicted from the allocation filter. While this may mean that there is a potential for other entries which have only recently allocated into the allocation filter being evicted, overall the mechanism to periodically review which entries are present in the allocation filter enables instructions which change their behaviour over time to make another attempt at having their predicted behaviour trained using the predictions storage structure.

In some examples, the training operation which is performed on entries in the prediction storage structure may stop when an entry is evicted and allocated into the allocation filter. Hence there may be no training of the states held in allocation filter entries. This may be simpler to implement in hardware as it avoids needing to expend training resource on the entries of the allocation filter already determined to have failed the training in the past.

However, in other examples the prediction training circuitry may continue performing the training operation to train, based on actual instruction behaviour, the failed predicted instruction behaviour represented by the at least one allocation filter entry. The training of the allocation filter entry may use a more limited set of information in the entry compared to the corresponding training applied to the prediction storage structure itself, as the allocation filter may not be used to generate predictions and so does not need to include information speculatively updated based on previous predictions which has not yet been confirmed by execution.

Hence, in examples where training is performed for the allocation filter, training of the entries of the allocation filter may be used to determine when an entry has later gained sufficient confidence that it is worth moving it back to the prediction storage structure. Hence, in some cases the retry condition discussed above may be a condition when it is determined that a confidence in the failed predicted instruction behaviour represented by a given allocation filter entry exceeds a retry threshold. While this approach may be more complex to implement in hardware, it has the benefit that the point at which the predicted behaviour becomes more stable can be detected so that an eviction from the allocation filter can be forced at this time. Also, it means that a predicted behaviour which remains unstable for a long time can remain in the allocation filter throughout that time to ensure that it is not allocated to the prediction storage structure again. This improves performance by increasing the accuracy in allocation filter replacement policy (providing a higher probability that more unstable behaviours are allocated to the allocation filter and more stable behaviours are allocated to the prediction storage structure).

In some examples the number of allocation filter entries provided in the allocation filter may be greater than the number of prediction state entries provided in the prediction storage structure. Since often the use of the allocation filter may be particularly useful for types of prediction storage structure dedicated to identifying relatively rare or specific patterns of instruction behaviour, for which there may be a greater number of entries for which training is unsuccessful than for which training is successful, it can be useful to provide the allocation filter with a greater number of entries than the prediction storage structure itself, so that it is possible to record a larger number of failed predicted instruction behaviours and avoid polluting the resource of the prediction storage structure with the failed predictions.

The technique discussed above can be used for any type of prediction storage structure, but particularly those structures used where the allocation ratio (number of allocations per lookup) into the prediction storage structure is large in comparison to the hit rate.

In one example the predicted instruction behaviour may be a branch behaviour of a branch instruction.

More particularly, the predicted instruction behaviour may comprise a prediction of how many iterations of a program loop will execute before a loop controlling branch instruction terminates the program loop. In such a loop termination predictor, allocations into the prediction storage structure may occur when a separate branch direction predictor for predicting whether a conditional branch instruction should be taken or not-taken provides an incorrect prediction and so a particular branch is mispredicted. Hence, the prediction allocation circuitry may identify, as a candidate instruction behaviour for allocation to the prediction storage structure of the loop termination predictor, an instruction behaviour of a mispredicted branch instruction for which the branch direction predictor provided an incorrect prediction.

In such a loop termination predictor the number of mispredicts of branches may be much higher than the number of branches for which behaviour is predictable using the loop termination predictor. For example a loop termination predictor may look for patterns where a predictable number of not-taken decisions for a particular branch instruction address is followed by a taken decision for the same address, or a predictable number of taken branch decisions for a given branch instruction address is followed by a not-taken decision for the same address. Since such loop termination scenarios are relatively rare in comparison to mispredictions then there may be a large number of entries of the prediction storage structure of the loop termination predictor which end up failing their training operation and so it can be useful to provide the allocation filter to avoid reallocating entries in the loop termination predictor's storage structure for the same branches already determined in the past not to follow the loop termination pattern. Hence, the provision of the allocation filter enables a much more efficient loop termination predictor to be provided since the total number of entries in the main prediction storage structure for the loop termination predictor can be reduced without sacrificing prediction performance.

Another example of a prediction storage structure for which the technique discussed above can be useful may be a storage structure which provides a prediction of one or more addresses expected to be accessed in future memory accesses. In this case the speculative operation performed based on the predicted instruction behaviour may be the prefetching of data from the predicted addresses into a cache. Different forms of address predictor could be used, for example a stride predictor which aims to predict the addresses based on a regular stride offset between addresses of successive memory accesses, or a load address predictor which uses the program counter addresses of load instructions to predict what regions of data may be needed in future and then prefetches the predicted addresses into the cache. The allocation filter discussed above can be used for either of these types of address predictor since again these address predictors may train multiple entries based on observed addresses of load or store instructions, but some instructions may not encounter the types of patterns sought by the address predictor and so may fail their training. The allocation filter can avoid entries for such load instructions being populated into the main prediction storage structure in future. In the case of address prediction, each allocation filter entry may specify at least one of: a prohibited instruction address region comprising one or more addresses, for which the prediction allocation circuitry is configured to prohibit allocation of a new entry in the prediction storage structure in response to a load/store instruction having an instruction address in the prohibited instruction address region; a prohibited target address region comprising one or more addresses, for which the prediction allocation circuitry is configured to prohibit allocation of a new entry in the prediction storage structure in response to a load/store instruction specifying a target address in the prohibited load instruction address region; and a stride offset which is prohibited from being allocated an entry in the prediction storage structure. Hence, there may be different ways of identifying what entry should not be allocated into the prediction storage structure.

FIG. 1 schematically illustrates an example of a data processing apparatus 2 having a processing pipeline comprising a number of pipeline stages. The pipeline includes a branch predictor 4 for predicting outcomes of branch instructions. A fetch stage 6 generates a series of fetch addresses based on the predictions made by the branch predictor 4. The fetch stage 6 fetches the instructions identified by the fetch addresses from an instruction cache 8. A decode stage 10 decodes the fetched instructions to generate control information for controlling the subsequent stages of the pipeline. A rename stage 12 performs register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. The ability to map architectural registers to different physical registers can also facilitate the rolling back of architectural state in the event of a branch misprediction. An issue stage 16 queues instructions awaiting execution until the required operands for processing those instructions are available in the registers 14. An execute stage 18 executes the instructions to carry out corresponding processing operations. A writeback stage 20 writes results of the executed instructions back to the registers 14.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. Access to memory may be controlled using a memory management unit (MMU) 35 for controlling address translation and/or memory protection. The load/store unit 26 may use a translation lookaside buffer (TLB) 36 of the MMU 35 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor may not have a rename stage 12.

The apparatus 2 may also include a prefetcher 40 which monitors the addresses accessed by load instructions executed by the load/store unit 26, and stores prediction state indicating information used for predicting future patterns of address accesses which can be used to control the data cache 30 to prefetch data required by future load instructions into the data cache before the corresponding load instructions have actually been executed by the load/store unit 26. For example the prefetcher 40 could train prediction entries to recognise stride address patterns, or could be trained to recognise that when the program counter address reaches a particular address region then a certain group of load target addresses should have their data loaded into the data cache 30 if not already cached. Although not shown in FIG. 1, a similar prefetcher could be used to prefetch TLB entries into the TLB 36 based on prediction state information trained based on actual behaviour observed for previous instructions.

Figure 2:
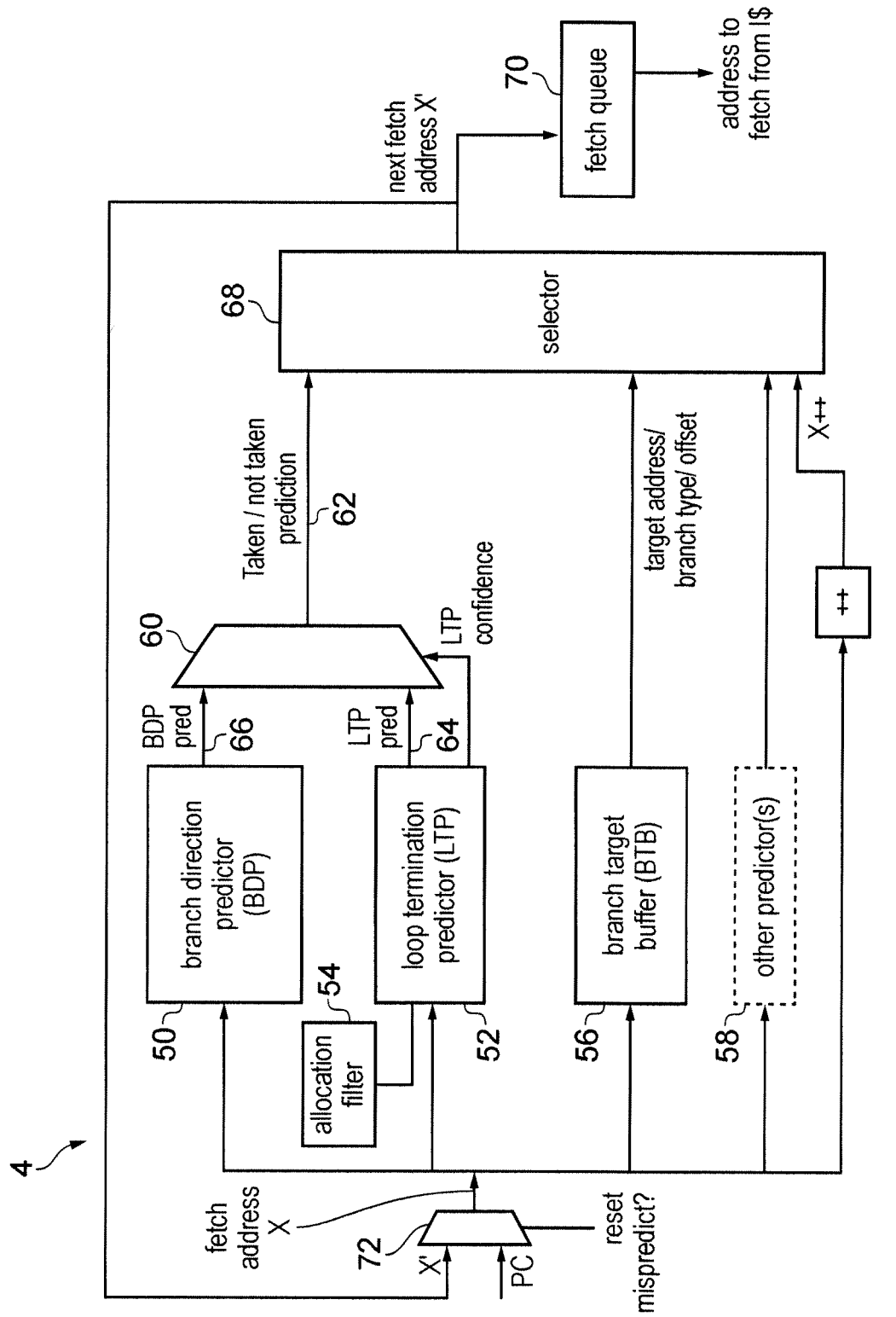
FIG. 2 shows an example of components of a branch predictor including a loop termination predictor.

FIG. 2 illustrates an example of components of the branch predictor 4 in more detail. The branch predictor 4 may include a branch direction predictor (BDP) 50, a loop termination predictor (LTP) 52 provided with an allocation filter 54, a branch target buffer (BTB) 56, and optionally at least one other type of predictor 58 for predicting information about branch instruction behaviour. For example, the other predictor(s) could include a call-return stack for predicting return addresses of return branch instructions. It will be appreciated that the branch predictor 4 could have other components not shown in FIG. 2.

In each branch prediction cycle a fetch address X identifying a block of one or more instructions is supplied to the branch prediction components 50, 52, 56, 58 of the branch predictor 4. Each of these components lookup their branch prediction state entries based on the supplied fetch address X, and output an indication of whether there was a hit in the corresponding branch prediction component. If there is a hit, the component outputs an indication of a predicted behaviour of one or more branch instructions included in the corresponding block of one or more instructions identified by the fetch address X.

The branch target buffer (BTB) 56 is used to predict whether there are any branch instructions in the block of instructions identified by the fetch address X, and if there are any branch instructions predicted to be in that block, the BTB 56 also outputs predicted information on one or more of: the target address of each predicted branch instruction; the branch type of each predicted branch instruction; and an offset of the instruction address of each predicted branch instruction relative to the fetch address X. For example the branch type may indicate whether a particular branch instruction is predicted to be: a conditional branch or an unconditional branch; a procedure calling branch instruction used to make procedure or function call; a return branch instruction for returning processing to earlier processing following execution of a procedure or function; or other types of branches for which a specific type of other branch predictor 58 is provided.

Figure 3A:
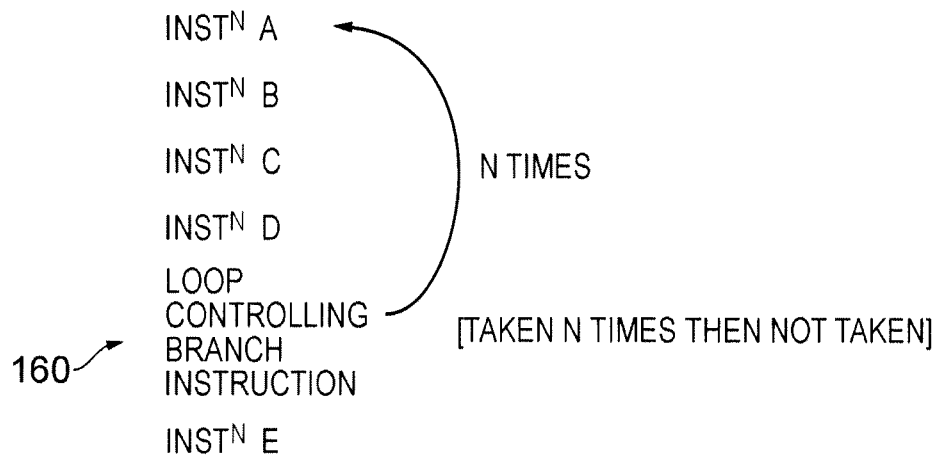
FIGS. 3A and 3B show examples of loops for which a loop controlling branch instruction may have its outcome predicted by the loop termination predictor.
Figure 3B:
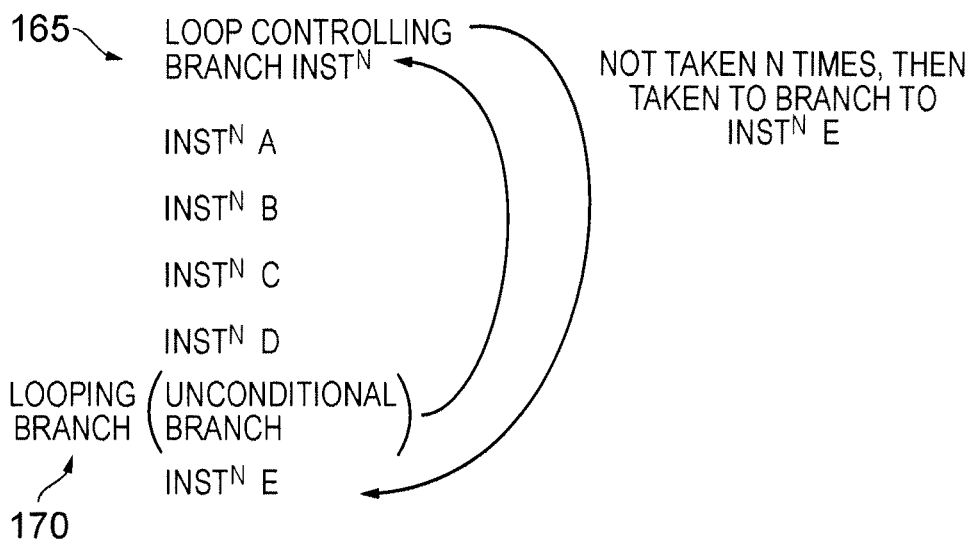

The branch direction predictor 50 and loop termination predictor 52 are both used to predict whether the outcome of a conditional branch instruction is expected to be taken or not taken. The LTP 52 is used for the specific case of a loop controlling branch instruction which governs whether a program loop is to terminate or continue for another iteration of the loop. FIGS. 3A and 3B show two examples of potential loop controlling instructions for controlling loop behaviour. In the example of FIG. 3A a certain sequence of instructions A to D is to be executed a certain number of times, and the loop controlling branch instruction 160 checks whether a governing condition which controls whether the loop should terminate is satisfied. If the loop termination condition is not satisfied, the loop controlling branch instruction 165 is taken to return to instruction A for another iteration. When the loop termination condition is satisfied, then the loop controlling branch instruction is not taken and processing then proceeds sequentially to instruction E which is outside the loop body. Hence, it can be expected that the loop controlling branch instruction will be taken N times during execution of the loop, and then not taken once.

FIG. 3B shows an alternative way of controlling loop behaviour where, instead of providing a conditional branch at the end of the loop body including instructions A to D, an unconditional branch 170 is provided at the end of the loop body, and this time the loop controlling branch instruction 165 is provided at the beginning of the loop body to check whether a loop termination condition is satisfied. In this case the loop controlling branch instruction 165 may be defined such that if the loop termination condition is satisfied then the loop controlling branch instruction is taken and controls program flow to branch to the instruction E outside the loop body, while if the loop termination condition is not satisfied then the loop controlling branch instruction 165 is not taken and allows processing to proceed sequentially through the rest of the loop body A to D. Hence, with the example of FIG. 3B, the behaviour expected for the loop controlling branch instruction may be that it is not taken N times and then taken once to branch to instruction E.

Hence, in general it may be expected that the loop controlling branch instruction 160, 165 should follow a pattern where it is either taken or not taken a larger number of times N, and then switches to the opposite branch direction prediction outcome once, to terminate the loop. This type of pattern may be hard to predict for the branch direction predictor 50, which may be provided with circuitry which assumes that branch behaviour may be relatively stable, providing the same taken or not taken outcome for a given branch instruction address. Hence, the branch direction predictor 50 may be relatively poor at predicting the final termination outcome for the loop controlling branch instruction 160, 165. As program loops are relatively common, providing a dedicated loop termination predictor 52 to detect the pattern of taken and not taken outcomes of a loop controlling branch instruction, so that it can predict how many iterations are likely to be required for a given program loop before the loop controlling branch instruction 160, 165 terminates the loop, this can provide a significant boost to performance of the branch predictor and hence the processing system overall. Hence, if the fetch address X hits in an entry of the LTP 52 which has been trained based on previous behaviour to provide sufficient confidence in the outcome predicted for a branch instruction provided in the block identified by the fetch address X, then a branch direction selector 60 selects as the taken/not taken prediction 62 the prediction 64 provided by the LTP 52, in preference to the prediction 66 provided by the BDP 50. On the other hand if there was a miss in the loop termination predictor or a hit in an entry with insufficient confidence in the LTP 52 then the selector 60 selects the prediction provided by the BDP 50 instead of the prediction 64 provided by the LTP 52.

A next fetch address selector 68 receives the various predictions made by the branch target buffer 56, other predictor 58, and the branch direction predictor 50 or loop termination predictor 52, and based on these predictions selects the next fetch address X' which represents an address from which the fetch stage 6 is to fetch the next block of instructions. The addresses of instructions from the previous fetch block X which are ahead of any taken branch, and the next fetch address X', are allocated to a fetch queue 70 and instruction fetches from the instruction cache 8 are initiated based on the sequence of addresses allocated to the fetch queue 70.

The next fetch address X' is also provided to an address selector 72 which in the following branch prediction cycle selects whether either the next fetch address X' provided in the previous cycle or a different program counter address PC is used as the fetch address X input in the following branch prediction cycle. For example, when there has been a system reset or a branch misprediction then the program counter PC may be set to a predetermined reset value or a restoration value representing an earlier point of processing, and this PC value may be used as the fetch address X for the next prediction cycle. On the other hand, if there has been no reset or misprediction then the next fetch address X' selected by the selector 68 in one cycle may be used as the input fetch address X in the following cycle.

When the predictions made by the BTB 56, BDP 50 and LTP 52 indicate that the block of instructions identified by fetch address X is not predicted to include any taken branch instructions, then the selector 68 selects as the next fetch address X' an incremented address X++ which corresponds to the fetch address X incremented based on the size of the fetch block of instructions (this represents the sequential program flow case). If the BTB 56 predicts that there is at least one branch in the fetch block then the selector determines based on the offsets provided by the BTB 56 and the taken or not taken predictions provided by the branch direction predictor 50 and loop termination predictor 52 the offset of the first taken branch, and if there is a taken branch, the selector 68 provides as the next fetch address X' the predicted target address corresponding to the first taken branch. If there is a taken branch predicted in the fetch block then the selector 68 ensures that the sequence of addresses in the fetch queue 70 includes the addresses from the start of the fetch block X to the taken branch and then the next address in the fetch queue 70 will be the next fetch address X' (skipping addresses between the taken branch and the end of the current fetch block X).

It will be appreciated that FIG. 2 is just one example of a potential branch prediction microarchitecture and other examples can also be used. Any known branch direction prediction technique can be used for the branch direction predictor 50, for example TAGE, perceptron, or gskew.

Figure 4:
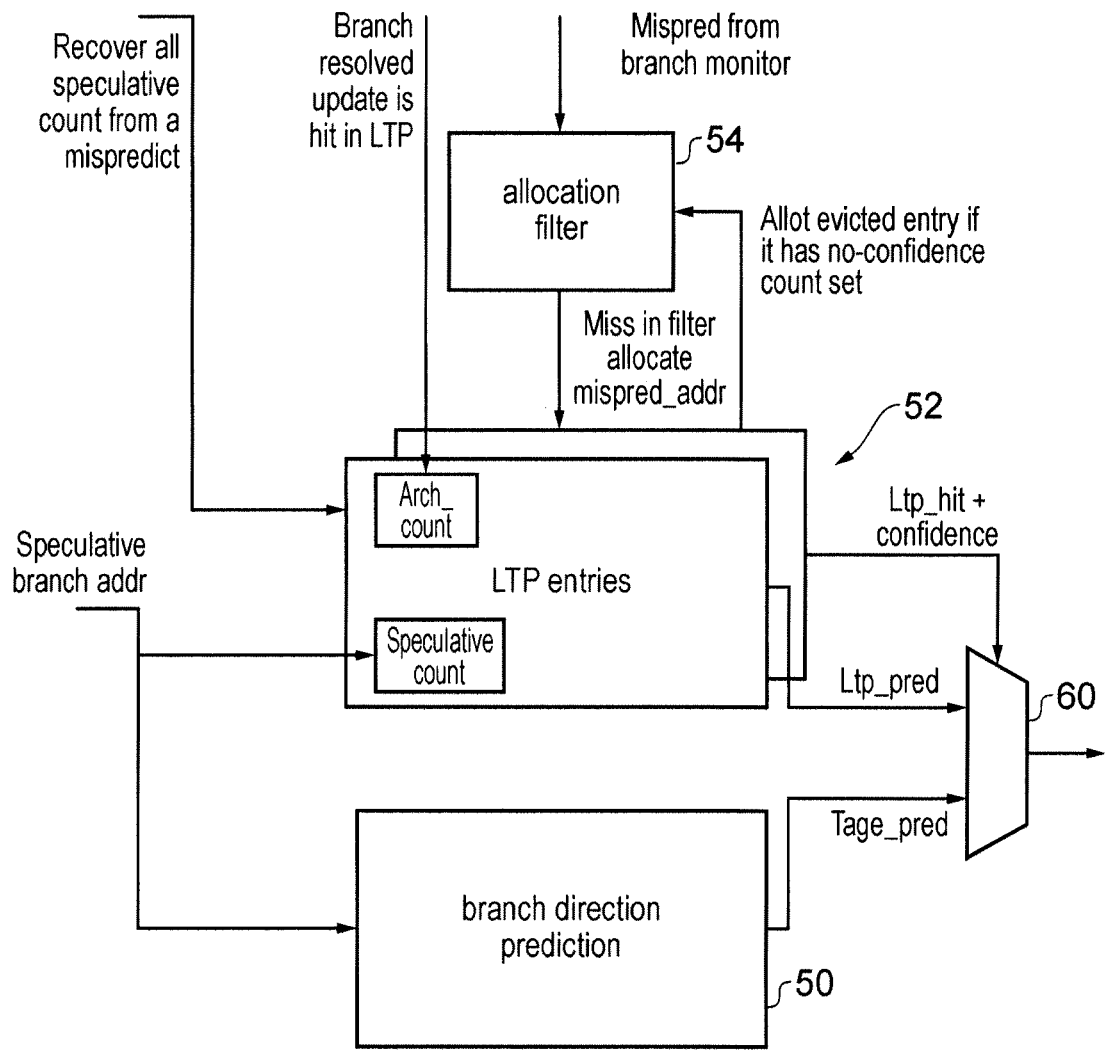
FIG. 4 shows use of an allocation filter to prevent allocation of a new entry in the loop termination predictor for branches which previously failed to provide sufficient confidence in a training operation.

FIG. 4 shows an example of the interaction between the loop termination predictor 52, branch direction predictor 50 and allocation filter 54 in more detail. The loop termination predictor (LTP) 52 and allocation filter 54 each include a storage structure which comprises a number of entries. FIG. 5 shows an example of the entries of the LTP 52. Although not shown in FIG. 5, the LTP can be implemented as an N-way set-associative cache for example. Each entry includes a number of fields, including in this example:

A valid flag 72 indicating whether the corresponding entry 70 of the LTP 52 is valid, A tag value 74 indicating at least part of the branch instruction address associated with the corresponding entry, Replacement policy information 76 for controlling selection of a victim LTP entry 70 when a new entry needs to be allocated to the cache. For example the replacement policy 76 could be a least recently used (LRU) field which tracks how long the entry has remained valid since it was allocated to the LTP.

A termination outcome field 78 for indicating whether the corresponding loop controlling branch instruction 160, 165 is expected to be not taken or taken in the case when the loop terminates, that is, the termination outcome 78 may indicate whether the loop controlling branch 160, 165 is predicted to follow the pattern shown in FIG. 3A or the pattern shown in FIG. 3B. Which of the values 0 and 1 of the termination outcome flag 78 corresponds to each pattern is an implementation choice and this could be done either way round.

In the examples below, the outcome (taken or not taken) to be taken on the final iteration of the loop (which is the opposite outcome to the outcome predicted N times during the body of the loop) is referred to as the termination outcome.

A trip count field 80 indicating a prediction of the number of iterations to be executed for the loop before the termination outcome is selected. For example the trip count 80 may specify the value N indicating how many times the loop controlling branch instruction 160, 165 is to be taken or not taken in the examples of FIGS. 3A and 3B. There may be different ways of representing the trip count 80 as an absolute numeric value, depending on the particular microarchitectural implementation chosen. For example, in some cases the value represented in the trip count field 80 may represent the number of times the outcome opposite to the termination outcome is selected, excluding the instance when the termination outcome itself is selected, i.e. in the examples of FIGS. 3*a* and 3*b* the trip count field could be N. In other implementations, the iteration when the termination outcome is selected could also be factored into the trip count, i.e. in FIGS. 3A and 3B the trip count may be N+1. Hence, while the trip count field 80 may be correlated with the predicted number of times the loop iterates before it terminates, the particular numeric value represented by the trip count may vary depending on implementation.

An architectural count field 82 for counting iterations of the loop when the loop is not terminated (i.e. instances of executing the branch identified by the tag value 74 when the opposite outcome to the termination outcome 78 was identified). The architectural count 82 is updated based on the outcomes of the architecturally resolved instructions resolved by the branch unit 21 at the execute stage 18.

A speculative count field 84 which tracks the number of iterations of the loop for which the outcome of the loop controlling branch instruction 160, 165 has speculatively been predicted as corresponding to the outcome opposite to the termination outcome, when predicting outcomes of branches at the branch predictor 4.

A training phase indication 86 which indicates whether the predicted entry 70 of the LTP is currently undergoing a training phase when confidence has not yet reached a sufficient level that the prediction can be used for actual branch predictions.

A confidence field 88 indicating the level of confidence in the prediction provided by the trip count 80.

An unreliable indication 90 for indicating whether the value of the trip count 80 has been predicted to be unreliable, e.g. if the training phase has not yet completed despite at least a threshold period having elapsed since the entry was allocated or since the end of a previous "epoch" for periodically evicting entries still undergoing training from the prediction storage.

In some cases the training phase indication 86 may not be required, and whether the entry is in training could be deduced from the confidence field 88 alone. The unreliable indication 90 is similarly optional and in some cases any entry for which the confidence has not yet reached the threshold may be considered potentially unreliable. However, as described below, providing an additional unreliable indication 90 can help to improve performance by allowing entries which correspond to infrequently occurring branches to be evicted from the LTP 52.

The usage of the respective fields shown in FIG. 5 will now briefly be described. An entry is allocated into the LTP 52 for a given branch instruction if a prediction previously made by the BDP 50 is determined to be incorrect and no existing LTP entry 70 corresponds to the mispredicted branch (as discussed below, the allocation into the LTP may also depend on whether there is a miss in the allocation filter 54). Hence, branches which can have their direction accurately predicted by the BDP 50 do not need allocation into the LTP 52. However, if there was a branch which is mispredicted then a possible reason could be that it is a loop controlling branch instruction 160, 165 and so the loop termination predictor 52 can be used to predict its behaviour. Hence, the valid flag 70 for a given entry in the LTP 52 is set to 1, and part of the address identifying the mispredicted branch instruction is indicated in the tag field 74. An indication of the actual outcome of the mispredicted branch is used to determine the value to write to the termination outcome field 78. Typically, it will be the termination outcome of the loop controlling branch instruction 160, 165 (i.e. the outcome the branch should have been taken on the iteration of the loop when the loop terminates) that will be the one that is mispredicted as all previous iterations of the loop would have led to the opposite outcome being predicted by the BDP 50, and so one approach may simply be to set the termination outcome field 78 to match the actual branch outcome which occurred for the mispredicted branch instruction. Of course, depending on the mapping of the termination outcome field 78, other implementations may need to invert the actual outcome of the mispredicted branch to derive the termination outcome flag 78.

While it is hoped that the mispredicted branch allocated into the LTP 52 will be a loop controlling branch instruction 160, 165, it is also possible that the entry allocated into the LTP could relate to a branch which is not actually a loop controlling branch instruction but has been mispredicted for other reasons. Hence, a training phase starts to track the behaviour of that previously mispredicted branch over subsequent executions of the same branch to try to detect whether it follows one of the patterns shown in FIGS. 3A and 3B as being indicative of a loop controlling branch instruction.

During the training phase, the speculative count field 84 is not used. When the mispredicted branch is first encountered and a new entry is allocated into the LTP, the architectural counter 82 is initialised to 0. Subsequently, each time a branch has its outcome resolved by the branch unit 21 in the execute state 18, its address is looked up in the LTP 52. If there is a hit against an entry 70, then if the actual outcome of the branch does not match the termination outcome recorded in that entry the architectural count 82 of that entry is incremented to indicate that the loop is spinning for another iteration. If the actual outcome of the result branch does match the loop termination outcome for the hit entry, then it is checked whether the architectural counter 82 matches the current value predicted for the trip count 80. If so then confidence 88 can be increased and then the architectural count 82 is reset to 0 so that the next time the loop is encountered then the architectural counter 82 will start counting iterations once more. If it is found that the architectural counter 82 does not match the trip count 80 when the actual outcome of the branch corresponds to the loop termination outcome 78, then confidence 88 can be reduced, and then the architectural count 82 is copied to the trip count 80 before resetting the architectural counter 80 to 0. Hence the tip count 80 is updated to indicate the number of iterations which were executed before termination on the latest attempt to execute the loop. Hence, by this method the trip count 80 which provides the prediction of the number of iterations to execute in the loop before termination can be trained based on the observed behaviour of the actual instruction outcomes at the execute stage 18.

For some branch instructions this training works well and gradually confidence may be increased 88 until confidence is sufficiently high that the trip count 80 can start to be used to predict the actual branch outcome for the loop termination branch 160, 165. At this point the training phase indication 86 may switch states to indicate that training is complete. Now, when inputting the fetch address X into the loop termination predictor 52, if there is a hit against a valid entry for which training is complete, then the LTP 52 compares the speculative count 84 against the trip count 80. The speculative count 84 tracks how many iterations of the loop have been predicted to already have been performed before the point of program flow represented by the current fetch address X. This counting of loop iterations using speculative count 84 is speculative since the fetching of instructions at the fetch stage 6 is ahead of the point of the program reached non-speculatively by the execute stage 18. If the speculative count 84 is less than the trip count 80, then the branch is predicted to have the opposite outcome to the termination outcome 78 and the speculative count 84 is incremented, while if the speculative count matches the trip count 80 then this instance of executing the branch instruction is predicted to be the final iteration of the loop and the termination outcome 78 is predicted for that branch. Hence, when confidence 88 has got sufficiently high that the prediction can be trusted, the LTP 52 can predict whether the same branch instruction is expected to be taken or not taken depending on how many previous iterations have been determined as speculatively been performed based on the speculative count 84 and the prediction of the total number of iterations expected in the loop based on the trip count 80.

In the event of a misprediction, then in addition to the processing pipeline rewinding the operation of the pipeline, restoring previous architectural state, and resuming fetching from an earlier point of processing, the LTP 52 may also restore the speculative count fields 84 of each LTP entry. For example, the LTP 52 may copy the current values of the architectural count 82 of each LTP entry 70 into the corresponding speculative count fields 84 (or restore a previously captured snapshot of architectural counts 82) so that the branch predictor 4 can resume making branch predictions based on the number of loop iterations which have actually been committed at the execute stage 18, rather than the speculatively fetched iterations represented by the old value of the speculative count 84.

While this approach works well for some branch instructions, other branches which are mispredicted by the branch direction predictor 50 do not correspond to the loop controlling pattern shown in FIGS. 3A and 3B, or correspond to a loop where the number of iterations N executed before the loop terminates is variable, for example because the loop termination condition is data-dependent. Hence, sometimes, despite the effort taken to train a given LTP entry 70, the confidence 88 never reaches the threshold required to start using the predictions represented by that LTP entry. In practice, for the LTP there may be a larger number of entries for which the training operation fails than entries for which the training operation ends up being successful and provides sufficient confidence 88.

The allocation filter 54 is provided to record at least the tag values 74 of branches for which the LTP 52 has previously determined that the prediction failed to provide sufficient confidence by the end of the training phase or provided unreliable predictions as indicated by the fields 86, 88 or 90. In some systems, the end of the training phase may be after a certain period following allocation of the LTP entries 70, such as a period of time or a certain number of lookups to the LTP, or a certain number of hits in a given entry of the LTP. Alternatively, in some cases the training phase may be considered to have failed if, at the time when the entry is evicted to make way for another new allocation, the entry is marked as unreliable or has not yet reached sufficient confidence.

Hence, when a misprediction is detected for a resolved branch, then the branch instruction address may be looked up against the tag values 94 recorded in the allocation filter entries 91 of the allocation filter 54 and if there is a hit then no new entry is allocated for that branch in the LTP 52. This avoids branches which previously have failed their training phase being newly allocated into the LTP, which would risk throwing out another entry which is still undergoing training and could have eventually have reached a sufficient degree of confidence. On the other hand if there is a miss in the allocation filter 54 for the address of the mispredicted branch then if there is also a miss in the LTP 52 then a new LTP entry 70 is allocated and if there is no invalid LTP entry available then a victim selection operation is performed based on the replacement policy information 76 of the respective LTP entries 70 to select which entry is evicted from the LTP 52. When an entry is evicted from the LTP, then if the training phase is no longer active as indicated by field 86, and either the confidence 88 is lower than the required threshold or the unreliable indication 90 is set, then the evicted entry is allocated into a new entry of the allocation filter. If the evicted entry is still in the training phase, has reached sufficient confidence or is not marked as unreliable, then the evicted entry is simply discarded without allocating a new entry into the allocation filter 54. Hence, bad predictions can be recorded in the allocation filter 54 to stop them being allocated again into the LTP, preserving the resource in the LTP for those predictions more likely to succeed. This means that in order to obtain a given level of prediction performance it is not necessarily to include as many entries in the LTP. Since the tracking of the speculative count 84 and the training is relatively expensive, by reducing the total number of entries of the LTP 52 the overall circuit overhead in terms of area and power can greatly be reduced, even taking into account the additional resource used in the allocation filter 54.

Note that the victim selection algorithm for selecting a victim entry for evicting from the LTP 52 may not only be dependent on the replacement policy information 76, but could also depend on other fields. For example it may be preferable to select as the victim entry an entry still undergoing training 86 or with a low confidence 88, in preference to an entry which is no longer in training and has sufficient confidence.

In the simplest implementation, each entry 91 of the allocation filter 54 may specify a valid flag 92 indicating whether the entry is valid, and if valid, a tag value 94 corresponding to the tag 74 of the entry which was evicted from the LTP 52 in order to allocate the allocation filter entry 91. However, as shown in FIGS. 6A and 6B, optionally further information may be recorded in each entry 91 of the allocation filter 54 to implement a retry mechanism where periodically entries in the allocation filter 54 may be evicted when they meet a retry condition, so that they can then be allocated again into the LTP 52 to have another attempt at undergoing training.

The total number of allocation filter entries 91 in the allocation filter may be larger than the total number of entries 70 in the LTP structure 52.

Figure 6A:
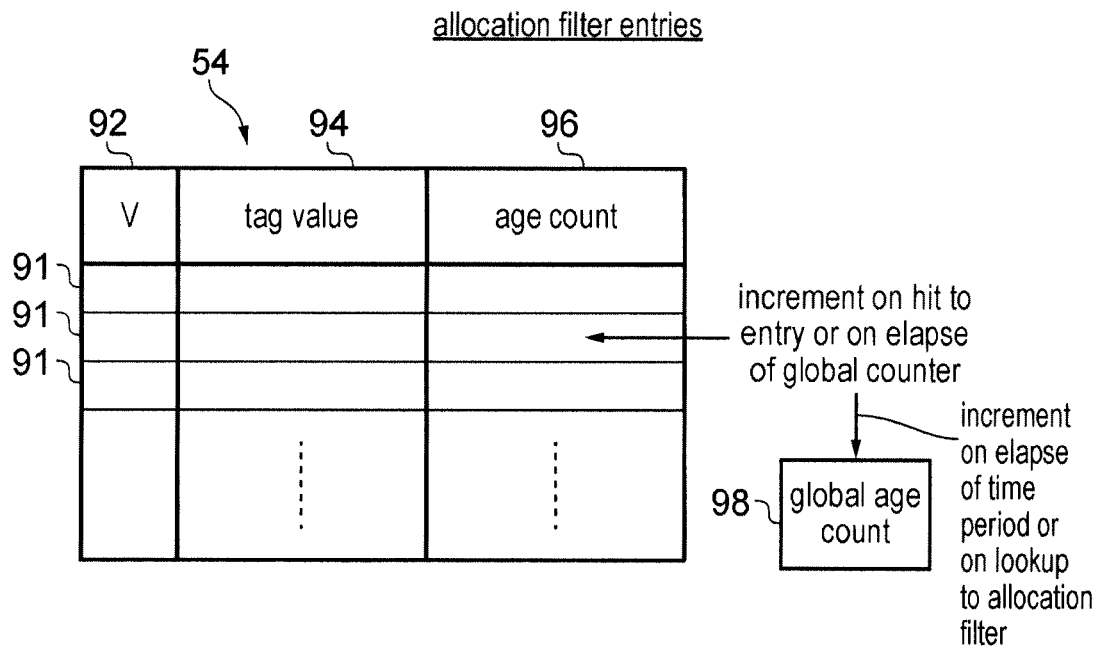
FIGS. 6A and 6B illustrate alternative examples of entries of the allocation filter.
Figure 6B:
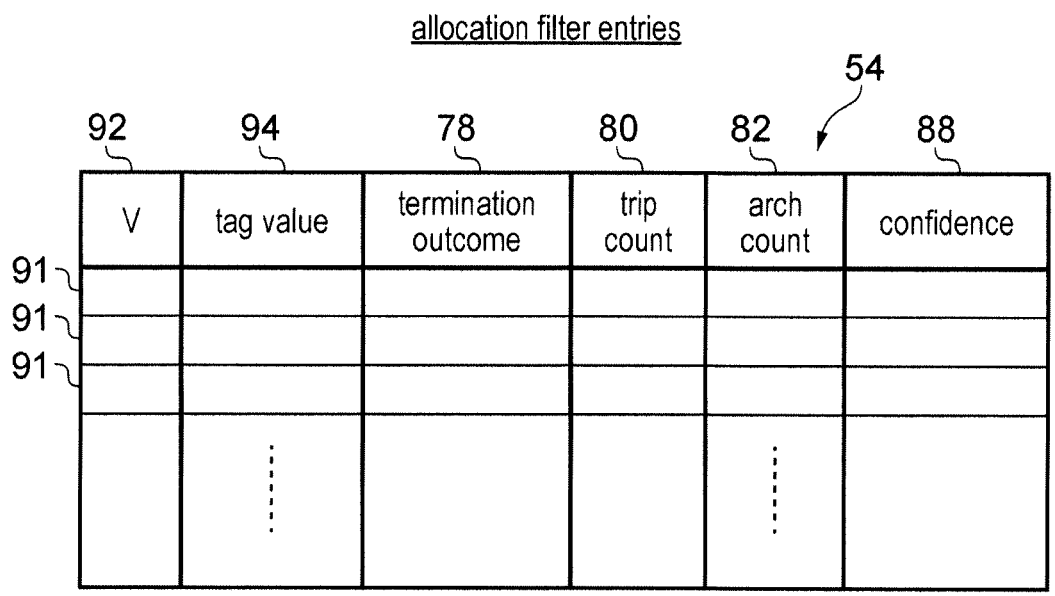

In the example of FIG. 6A, in addition to the valid field 92 and tag field 94, each allocation filter entry 91 may also specify an age counter 96 which is incremented on each hit to the allocation filter entry or on elapse of a certain period. For example, the period could be counted using a global age counter 98 maintained for the allocation filter as a whole which is incremented on the elapse of each processing cycle, or in response to elapse of a certain time period, or could be incremented per lookup of the allocation filter. When the global age counter 98 expires (either reaching a given threshold if counting up, or reaching 0 if counting down from a reset value to 0) then the age counters 96 of each entry 91 may be incremented. When the age counter 96 of a given allocation filter entry 91 reaches some threshold, then that entry may be evicted from the allocation filter. Hence, if later there is another misprediction of the branch instruction evicted from the allocation filter 54, then this time the allocation filter lookup will miss and so this time the branch can once more be allocated into the loop termination predictor structure 52.

The per-entry age counter 96 is optional, and other approaches may simply maintain a global age counter 98 which tracks some period of time counted in terms of absolute time per number of processing cycles, number of branch predictions, number of allocation filter lookups, etc., and which when it reaches some threshold or counts down to 0 triggers eviction of all of the allocation filter entries.

Alternatively, as shown in FIG. 6B, in addition to the valid field 92 and tag value 94, each allocation filter entry 91 of the allocation filter 54 may also include the termination outcome 78, trip count 80, architectural count 82 and confidence 88 which were stored in the corresponding LTP entry 70 which was evicted from the LTP 52 to form that allocation filter entry 91. In this case, then while entries are stored in the allocation filter 54, training of those entries 91 may continue so that as branches are resolved then the trip count 80, architectural count 82 and confidence 88 are updated to track the confidence in any prediction made based on the trip count 80. While the actual predictions represented by the allocation filter entries are not actually used for generating the predicted taken or not taken indication used by the LTP 52, the training nevertheless continues so that if the behaviour of the previously failed branch becomes more stable, and eventually the branch is determined to match the pattern of a loop controlling branch instruction 160, 165 with a sufficient degree of confidence, then when the confidence exceeds a threshold the allocation filter entry 91 can be evicted from the allocation filter 54 and return to the LTP 52, at which point the prediction represented by the newly allocated LTP entry 70 will already be warmed up. While some additional circuit resource may be needed to support training of the entries in the allocation filter, in a corresponding way to the training of the entries of the LTP 52, nevertheless, each allocation filter entry 80 may involve less incremental circuit overhead and power consumption since as the entries are not going to be used for any real predictions there is no need to track the speculative count 84 and provide circuitry for enabling recovery of the speculative count 84 in the event of misprediction.

Hence, in summary, when a branch is evicted from the LTP 52 after its training phase because it does not have a stable number of iterations (trip count 80), this branch will be allocated in the allocation filter 54. The allocation filter 54 will prevent a new allocation of this branch, at least for a defined number of new mispredictions. In this way, the highly mispredicted branch will not pollute the LTP 52 for a long time. The allocation filter 54 can be relatively large because it is a small structure accessed only on a misprediction. The allocation filter 54 allows to keep in the LTP 52 only the good candidates for prediction (or the candidates which are being tested for the first time). With this technique we can significantly reduce the size of the LTP 52 (e.g. by a factor of 10) for the same prediction rate.

Regardless of whether either of the approaches shown in FIGS. 6A and 6B are used, in some implementations, the LTP 52 may also maintain either a number of per-entry age counters 96 for each LTP entry 70, or a global age counter 98 shared between LTP entries 70, similar to the corresponding age counters 96, 98 shown for the allocation filter 54 in FIG. 6A. The age counters 96, 98 could be incremented each time a given period elapses (e.g. the period could be a certain period of time, a number of processing cycles, or a number of lookups to the LTP). When the age counter 96, 98 associated with a given LTP entry 70 reaches a threshold, if the entry is still in its training phase then the unreliable indication 90 for that entry is set (if the expired counter is a global counter 98 then the unreliable indication may be set for any LTP entry 70 still in its training phase).

An LTP allocation policy may be used which prevents an LTP entry 70 in its training phase being evicted from the LTP when its unreliable indication 90 is clear. However, eviction of an LTP entry 70 still in its training phase may be allowed when its unreliable indication 90 is set (in this case the evicted entry may also be allocated to the allocation filter 54). This approach allows LTP entries 70 which have not completed their training operation because they have only been resident in the LTP for a short time to be protected from eviction, to given them a fair chance at training, but enables LTP entries 70 which do not complete their training operation because the corresponding branch occurs infrequently to be evicted from the LTP once they have remained resident for a long time, to avoid those LTP entries 70 wasting LTP storage capacity which could better be used for training predictions for more frequently occurring branches.

Figure 7:
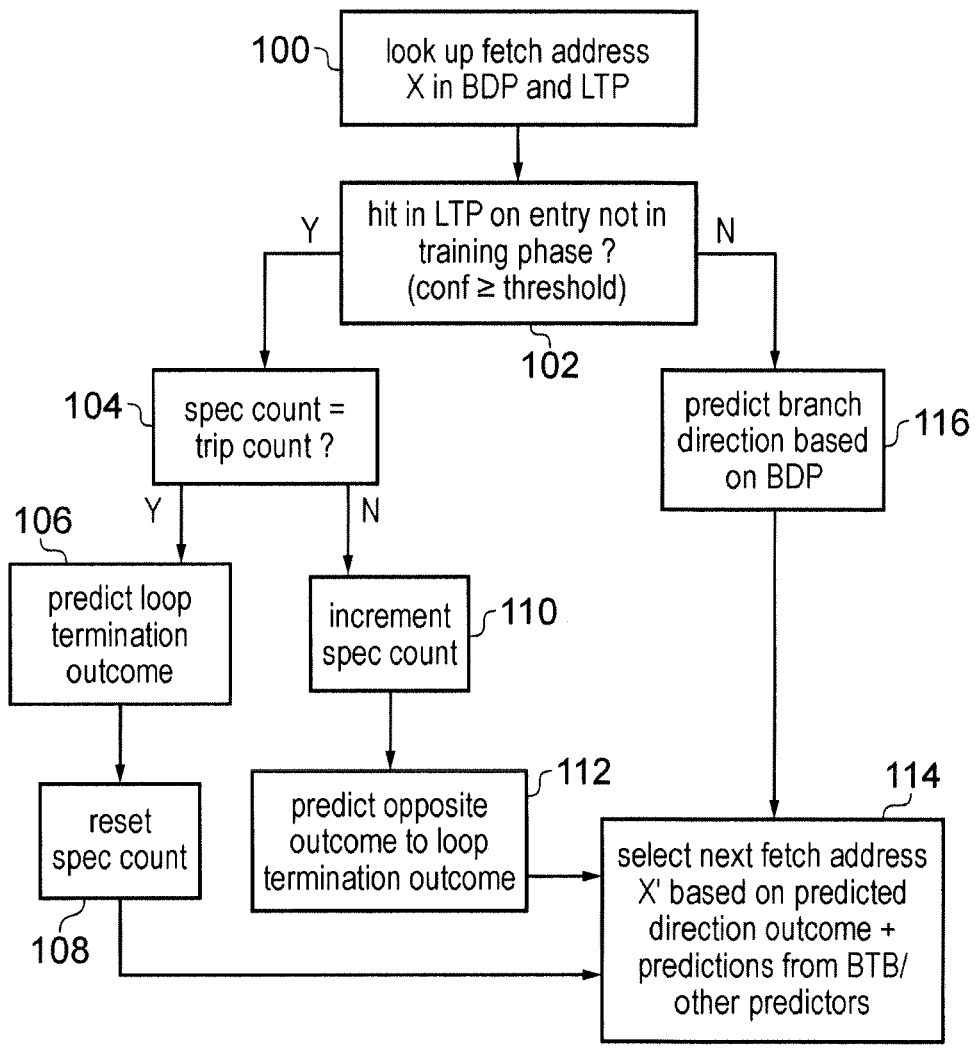
FIG. 7 is a flow diagram illustrating a method of obtaining a branch direction prediction based on the loop termination predictor.

FIG. 7 is a flow diagram illustrating a method of making a prediction of a branch direction outcome based on the branch direction predictor 50 and loop termination predictor. At step 100 the current fetch address X is looked up in both the BDP 50 and LTP 52. At step 102 the branch predictor 4 determines whether there is a hit in the LTP 52 for an entry not in the training phase for which the confidence 88 is greater than or equal to a given threshold. If so then at step 104 the branch predictor 4 determines whether the speculative count 84 for the hit entry 70 of the LTP 52 matches the trip count 80 for that entry 70, and if so then at step 106 the termination outcome indicated by field 78 of the hit entry is predicted as the outcome for the current branch. At step 108 the speculative count 84 is reset to 0. If at step 104 the speculative count 84 was determined not to match the trip count 80 then at step 110 the speculative count 84 is incremented and at step 112 the prediction circuitry predicts, as the outcome for the current branch, the opposite outcome to the outcome indicated as the termination outcome 78. At step 114, regardless of whether the predicted outcome was the termination outcome or the opposite outcome, the next fetch address X' is selected based on the predicted outcome (as well as any predictions made by the BTB 56 or other predictors 58) and then this may be used to control fetching of subsequent instructions by the fetch stage 6 and also may control which address is looked up as the current fetch address X in a subsequent branch prediction cycle.

On the other hand, if at step 102 there was a miss in the LTP 52 or a hit against an entry still in training or with a confidence 88 less than the threshold, then at step 116 the branch direction is predicted based on prediction state information recorded in the branch direction predictor 50. In this case again at step 114 the next fetch address is selected based on the prediction provided by the BDP 50, BTB 54 and/or other predictor 58.

Figure 8:
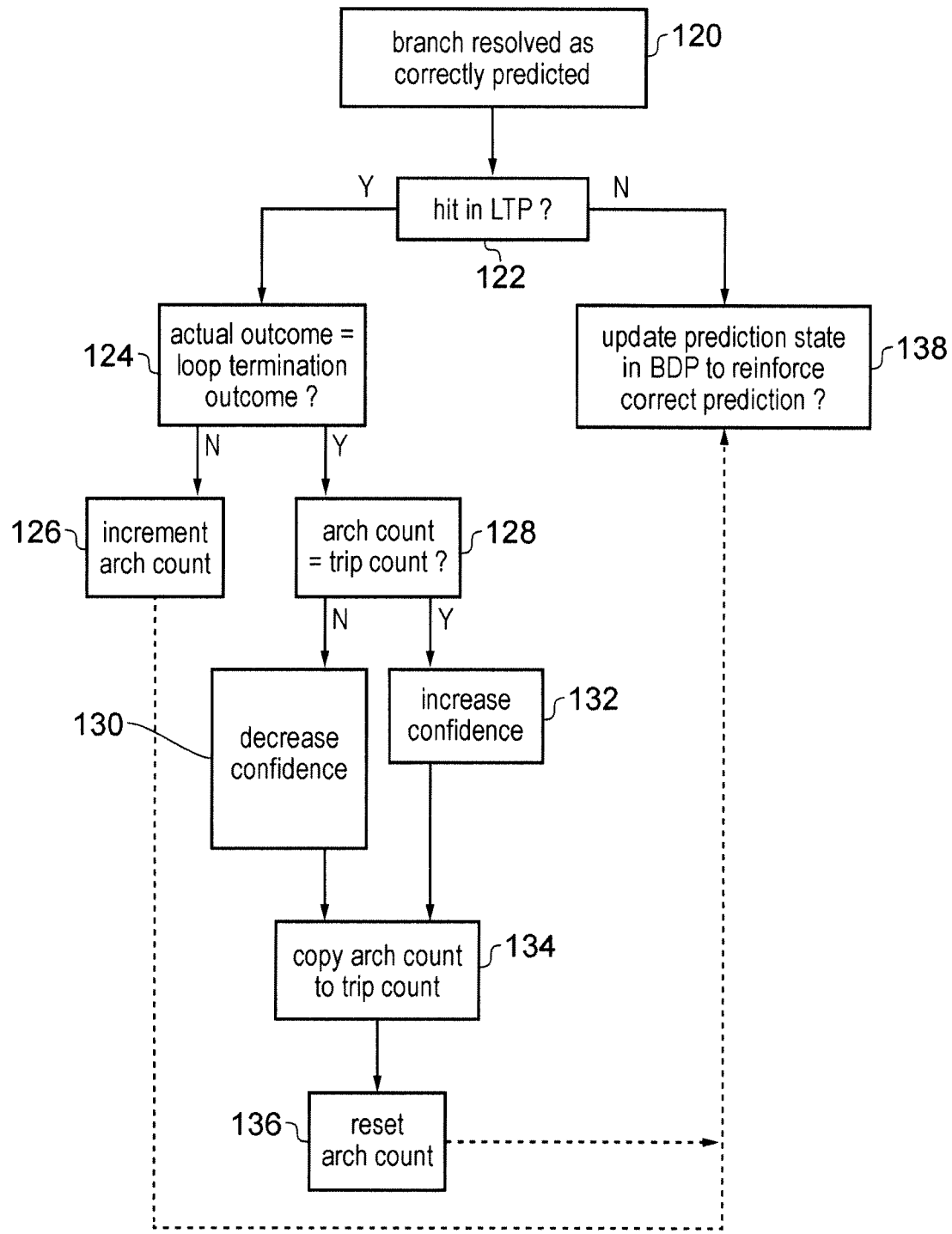
FIG. 8 is a flow diagram illustrating a method of updating prediction state entries of the loop termination predictor in response to a correctly predicted branch.

FIG. 8 illustrates a flow diagram showing processing performed when a branch is resolved by the branch unit 21 as being correctly predicted by the branch predictor 4. At step 120 an indication is received from branch unit 21 indicating that the branch prediction is correct and in response at step 122 the address of the branch is looked up in the LTP 52 and it is determined whether there is a hit for the current branch. If so then at step 124 the LTP determines whether the actual branch outcome for the correctly predicted branch matches the loop termination outcome 78 indicated in the hit entry 70 of the LTP 52.

If the actual branch outcome of the correctly predicted branch is not the loop termination outcome then at step 126 the architectural count 82 for the hit entry is incremented.

However, if the actual outcome was the loop termination outcome, then at step 128 it is determined whether the architectural count 82 is equal to the trip count field 80. If so then at step 132 the confidence 88 is increased (assuming that the confidence had not yet reached the maximum level). If the architectural count 82 does not match the trip count 80 then at step 130 the confidence 88 is decreased. Note that at step 128, if the hit entry of the LTP 52 is an entry no longer in the training phase, then this means the prediction for the branch was based on that hit LTP entry, and so as the branch was already determined to be correctly predicted at step 120, this means that for such an entry step 128 would follow the 'YES' branch to proceed to step 132. However, if the hit entry of the LTP 52 is an entry still in the training, the taken/not taken prediction for that branch would have been based on the BDP 50, not the LTP 52, and so it is possible that even though the branch was correctly predicted by the BDP 50, the prediction represented by the LTP 52 could still be incorrect. Hence, the 'NO' branch following step 128 may arise for entries still in the training phase which are not yet being used to produce actual branch predictions used for controlling speculative fetching.

At step 134 the current value of the architectural count 82 is copied to the trip count field 80. Step 134 could be omitted if the architectural count 82 did match the trip count 80 at step 128, or alternatively step 134 could be performed regardless of whether the architectural count 82 matched the trip count 80 as if they match then the result of copying the architectural count to the trip count would be the same as if no copying had been performed. At step 136, the architectural count 82 of the hit LTP entry 70 is reset to 0 to resume counting from the start of the loop the next time the same branch is encountered. If, at step 122, a miss was detected in the LTP 52 then instead at step 138 the prediction state of the branch direction predictor 50 is updated to reinforce the correct prediction. For example confidence in an entry indicated in the BDP 50 could be increased. As shown by the dotted lines in FIG. 8, optionally following step 126 or 136 the method could also proceed to step 138 to update the BDP prediction state. Hence, it is possible to either not update BDP prediction state when there is a correctly predicted branch which hits in the LTP, or update the BDP prediction state regardless of whether the correctly branch hits in the LTP.

Figure 9:
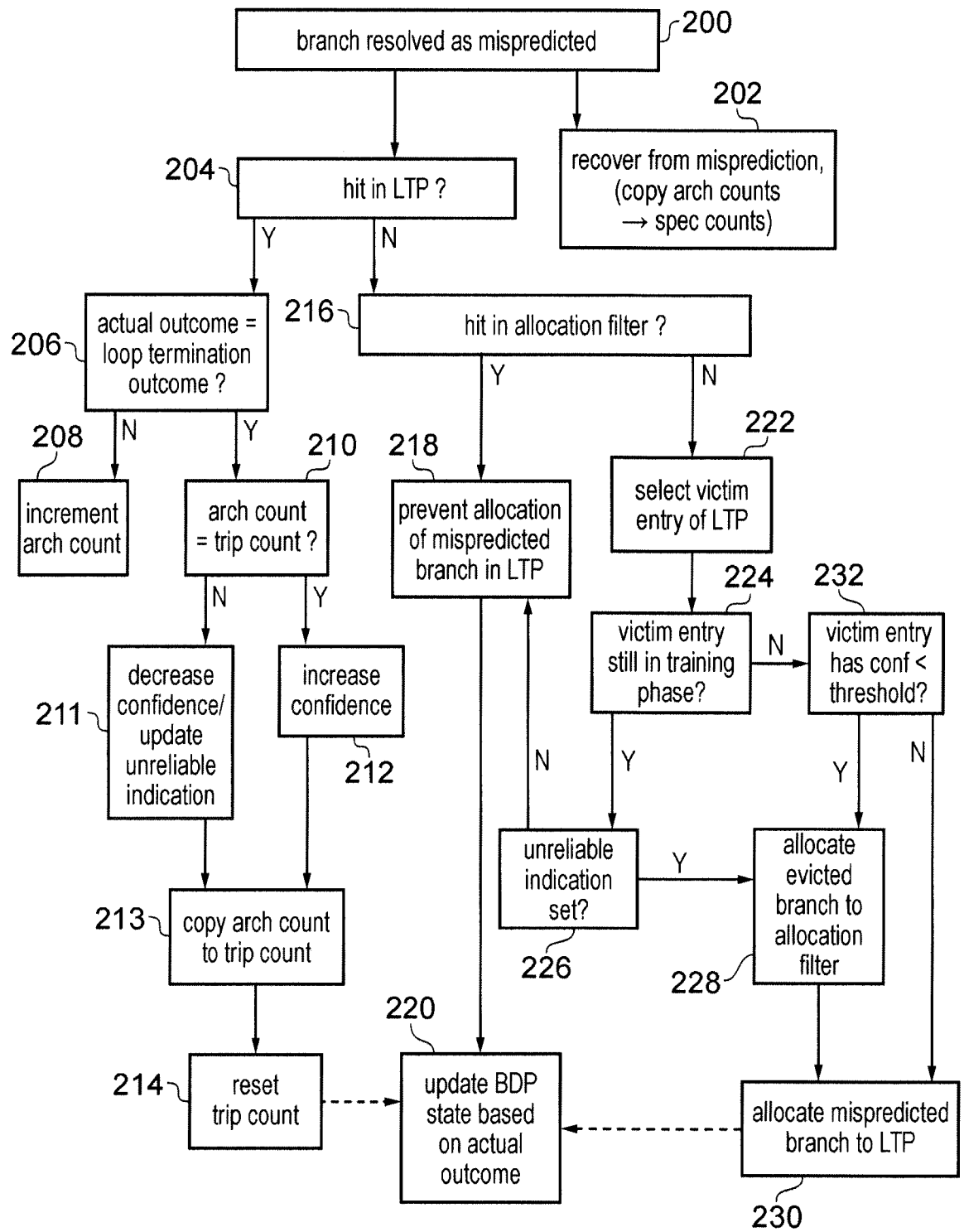
FIG. 9 is a flow diagram illustrating a method of handling a mispredicted branch using the loop termination predictor and allocation filter.

FIG. 9 is a flow diagram showing processing performed when a misprediction is detected by the branch unit 21, when the actual outcome for a given branch is different to the predicted outcome determined by the branch predictor 4

(this method may be carried out at commit time). At step 200 a given branch is resolved as being mispredicted, and in response at step 202 a misprediction recovery operation is performed. This may include restoring a previously captured snapshot of architectural state to the registers 14, flushing the processing pipeline of instructions beyond the last correctly resolved instruction, and triggering the fetch stage 6 to resume fetching from the point of the program corresponding to the outcome (new instruction flow) of the resolved branch. In addition the misprediction recovery operation may include restoring the speculative count fields 84 based on values of the architectural count fields 82, to rewind the speculative count back to the last known correct value. For an in-order processor, where branches are resolved in program order, the restoration of the speculative count fields 84 may be performed by copying all the values of the architectural count values 82 in the respective entries 70 of the LTP 52 into the corresponding speculative count fields 84. For an out-of-order processor, when making a prediction for a given branch based on a given LTP entry, the LTP 52 may retain a snapshot of the architectural count values 82 of that LTP entry and each other LTP entry at the time the prediction was made, which can be restored to the speculative count values 84 of each LTP entry if the branch is detected to be mispredicted. This storage of snapshots of architectural count values can be relatively expensive (as multiple snapshots may be maintained corresponding to different points of execution), which is one reason why the allocation filter entries can be more efficient than the corresponding entries of the LTP 52, as the allocation filter entries are not used to make prediction and so do not need to track speculative recovery state for recovering from a misprediction.

Meanwhile, at step 204 the address of the mispredicted branch is looked up in the LTP 52 and the allocation filter 54. If there is a hit in the LTP 52, then at step 206 it is determined whether the actual outcome of the mispredicted branch was the loop termination outcome 78 indicated in the hit entry of the LTP. If not, then this means that the actual outcome corresponds to an iteration of the loop when the loop was not terminated and so at step 208 the architectural count 82 for the hit entry of the LTP is incremented. If the actual outcome is determined at step 206 matches the loop termination outcome 78 for the hit entry 70 of the LTP 52, then at step 210 the branch predictor 4 checks whether the architectural count 82 matches the trip count 80 in the hit entry 70 of the LTP 52. If the hit entry 70 is no longer in the training phase, the entry would have been used to generate the original branch prediction for that entry, so the fact that the branch was resolved as mispredicted will imply that the architectural count 82 cannot match the trip count 80. However, for entries still in the training phase the original branch prediction would have been based on the BDP 50, so it is possible that even for mispredicted branches the architectural count 82 could still match the trip count 80 in a hit LTP entry 70 still undergoing training. Hence, if the architectural count 82 does not match the trip count 80 for the hit LTP entry 70, at step 211 the confidence 88 for the hit LTP entry 70 is decreased as the number of iterations in the loop has varied. However, if at step 210 the architectural count 82 matches the trip count 80 then the confidence 88 may be increased. At step 213 the current value of the architectural count 82 is copied into the trip count field 80 so that the trip count is updated to match the number of iterations detected on the most recent attempt to execute the loop (again this step could be omitted if at step 210 the architectural count 82 matched the trip count 80), and at step 214 the architectural count 82 of the hit LTP entry 70 is reset to 0 to resume counting the next time the loop is encountered.

If there was a miss in the LTP at step 204, then at step 216 it is determined whether there was a hit in the allocation filter 54. If so, then at step 218 allocation of an entry in the LTP 52 for the mispredicted branch is prevented, since this branch has already been previously detected as failing the training phase and therefore it is preferable not to allocate it into the LTP again to avoid evicting an entry for a branch which is still undergoing training and could potentially reach sufficient confidence that it may provide good predictions. This ensures that even if the training phase takes a long time to complete for those entries that do match the loop termination pattern, it will not prematurely be evicted due to allocation of a branch which has already previously been detected as not matching the loop termination pattern. Meanwhile, at step 220 the branch direction prediction state may be updated based on the actual branch outcome detected for the branch which hit in the allocation filter. As shown in FIG. 9, step 220 may also be performed in cases when there was a hit in the LTP 52 when the prediction was incorrect, or when there is a miss in both the LTP 52 and allocation filter 54 (in contrast, on a hit in the LTP 52 with a correct LTP prediction, the updating of the BDP can be omitted).

If at step 216 a miss was detected in the allocation filter 54, then at step 222 a victim entry 70 is selected in the LTP 52, for storing the prediction for the mispredicted branch. If there are any invalid entries then one of the invalid entries may be selected as the victim entry. If all entries are currently valid then entries which have lower confidence could be selected in preference to entries which have completed training and have higher confidence. In addition or alternatively, the replacement policy information 76 may be used to select the victim entry (e.g. based on a least recently used policy).

At step 224 the allocation circuitry controlling allocation into the LTP 52 may determine whether the selected victim entry has finished its training phase. If the victim entry is still in its training phase, then at step 226 the allocation circuitry determines whether the unreliable indication 90 is set for the victim entry. If the unreliable indication 90 is set for the victim entry, then at step 228 a new allocation filter entry 91 is allocated in the allocation filter 54 specifying the tag value 94 matching the tag value 74 of the victim entry, and at step 230 information regarding the mispredicted branch (such as its tag value) is written into the victim LTP entry 52 and any previous values of the fields 74 to 90 in the victim entry are cleared. The training operation shown in FIG. 8 and in the steps 206 to 214 of FIG. 9 can then start to be performed on the newly allocated entry. Hence, by evicting entries which are still in the training phase despite having been resident for a relatively long time (as indicated by the unreliable indication 90), this frees up space for other branches which may be more likely to succeed in training. In contrast, if at step 226 the unreliable indication 90 was clear (not set) for the victim entry selected at step 224 which is still in the training phase, then at step 218 allocation of the mispredicted branch in the LTP is prevented. This ensures that an entry still undergoing training (which has not yet remained resident in the LTP for a long time as indicated by the unreliable indication 90 being clear) is retained in the LTP to continue training.

On the other hand, if at step 224 the victim entry was not in the training phase, then at step 232 the allocation circuitry determines whether the victim entry has a confidence 88 less than a threshold. If the confidence is less than the threshold, then again at step 228 a new allocation filter entry 91 is allocated in the allocation filter 54 specifying the tag value 94 matching the tag value 74 of the victim entry, and at step 230 the information on the mispredicted branch is written into the victim LTP entry 52 and any previous values of fields 74 to 90 in the victim entry are cleared. In contrast, if at step 232 the victim entry had a confidence equal to or greater than the threshold, then step 228 is omitted and at step 230 the mispredicted branch is allocated to the victim LTP entry 70 without allocating an entry for the evicted branch in the allocation filter 54.

Figure 10:
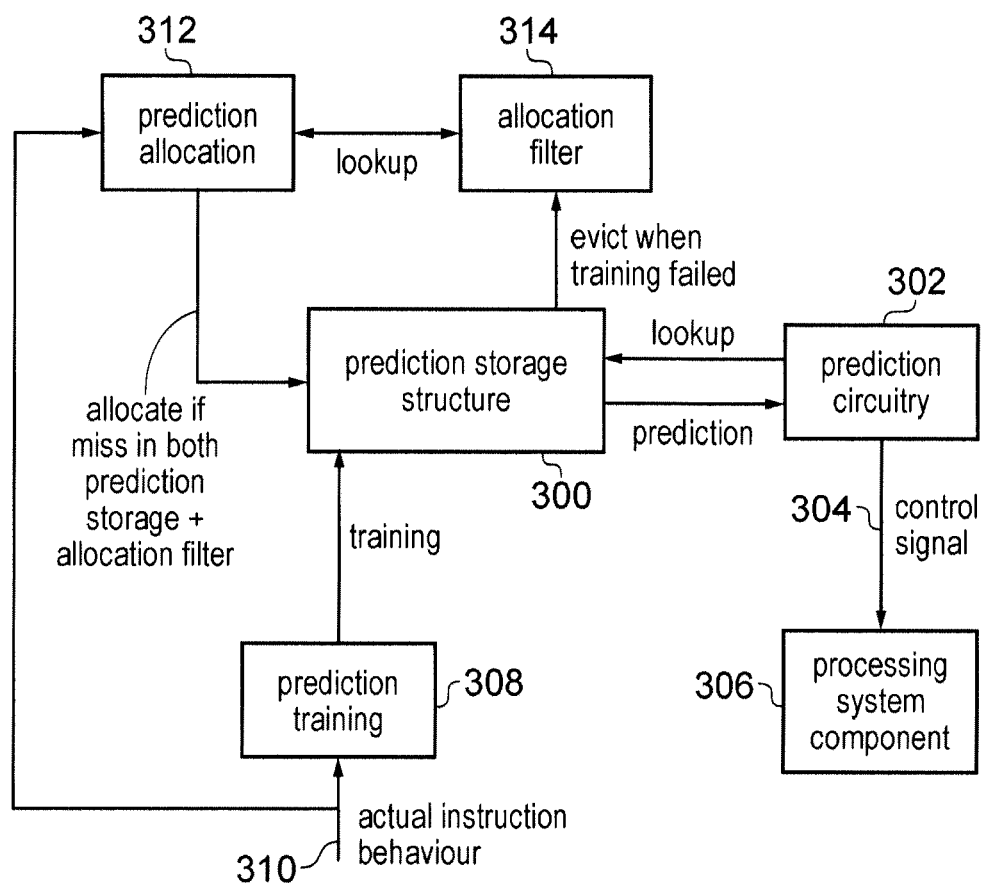
FIG. 10 illustrates a second example of a prediction storage structure for which allocation is controlled based on an allocation filter.

The loop termination predictor is one example of a prediction storage structure which could benefit from use of the allocation filter to suppress allocation of entries for predicted behaviour previously detected to have failed the training operation. However, as shown in FIG. 10 such an allocation filter could also be used for other types of prediction storage structure 300. The prediction storage structure 300 may be any storage structure which has entries providing information on predicted instruction behaviour, which can be looked up by prediction circuitry 302 to obtain a prediction which is used to generate a control signal 304 for controlling a processing system component 306 to perform a speculative operation. In the case of the LTP 52, 300 for example the processing system component 306 may be the fetch stage 6 which speculatively fetches instructions based on the prediction made based on the prediction storage structure 300 (the LTP 52). Another example of the prediction storage structure 300 could be a stride predictor or load address predictor, and in that case then the processing system component 306 may be the prefetcher 40.

The prediction storage structure 300 is subject to training by prediction training circuitry 308 which, based on actual instruction behaviour 310 detected when instructions are actually executed, trains the prediction state information stored in the prediction state entries of the prediction storage structure 300 to increase the likelihood that behaviour observed in the past will be predicted again when a corresponding scenario is encountered again.

Prediction allocation circuitry 312 is provided to control allocation of entries in the prediction storage structure 300 and in an allocation filter 314. When an actual instruction behaviour 310 is detected for which there is a miss in both the prediction storage structure 300 itself and in the allocation filter 314, then the prediction allocation circuitry 312 allocates a new entry into the prediction storage structure. If an entry has to be evicted to make way for the new entry then the prediction allocation circuitry 312 checks whether the evicted entry was one for which the training operation has failed or has not yet reached sufficient confidence, and if so the corresponding entry is transferred to the allocation filter 314 while if the evicted entry is no longer in its training phase because the training was successful then the evicted entry is simply discarded without allocation into the allocation filter. Hence, the lookup into the allocation filter 314 by the prediction allocation circuitry 312 means that allocations into the prediction storage structure 300 can be avoided if training has previously been determined to have failed for the corresponding instruction behaviour. This avoids polluting the prediction storage structure 300 many times with the same failed behaviour.

Figure 11:
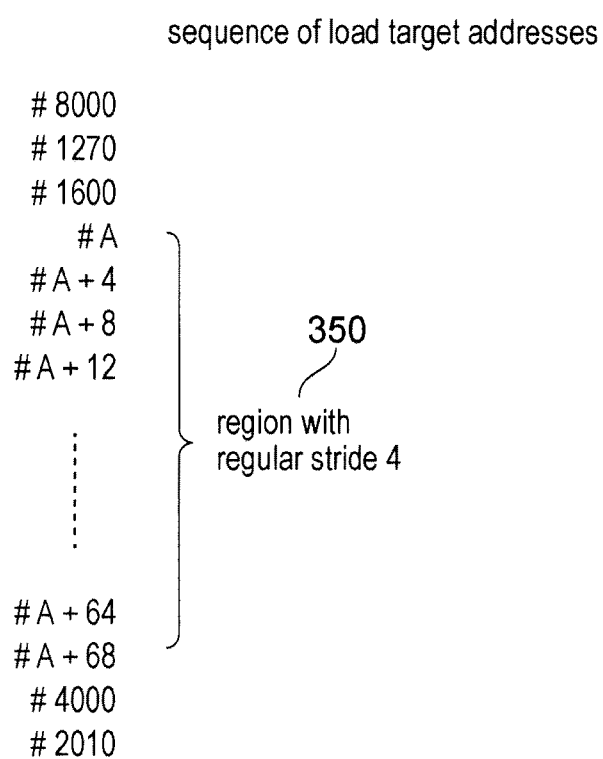
FIG. 11 shows an example of prediction of a load target address, for example based on detecting a stride pattern.

FIG. 11 shows an example of a predicted behaviour in cases where the prediction storage structure 300 is a stride address predictor. As shown in FIG. 11, within a sequence of load target addresses from which data is accessed by successive load instructions, there may be a region 350 where the addresses follow a regular stride pattern, for example in this case the addresses are at intervals of a certain offset 4.

Figure 12:
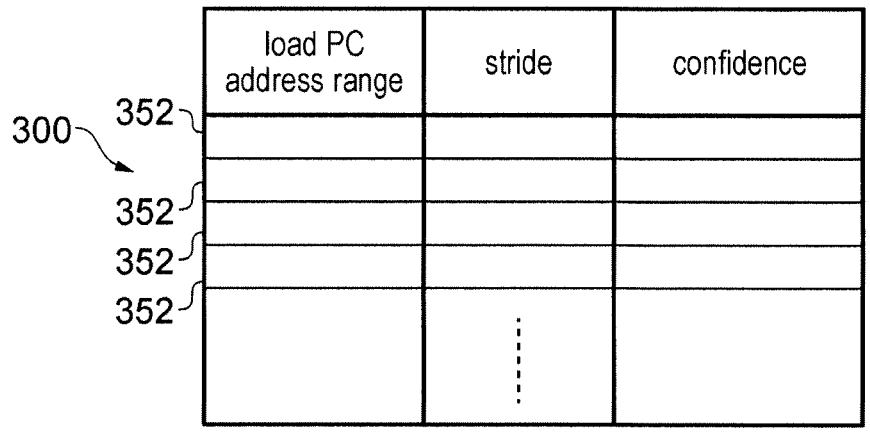
FIG. 12 shows examples of entries of a stride address predictor and allocation filter in a third example.
Figure 12:
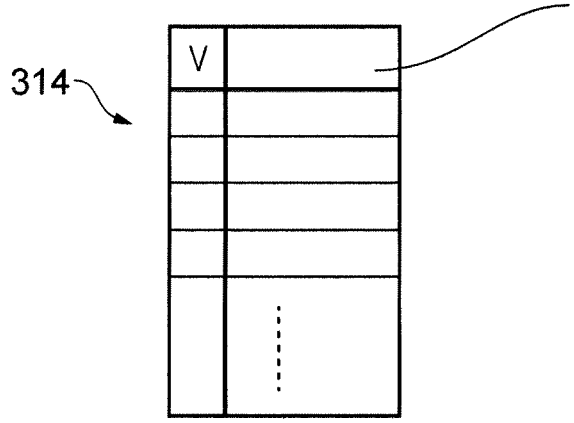

As shown in FIG. 12 a stride address prediction structure 300 may aim to predict instances where the stride increases at such intervals. For example each entry 352 within the stride address prediction structure could include an indication of a certain address range for which load instructions with a program counter address within that range should be predicted as having the determined stride, a predicted stride offset, and a confidence associated with the predicted stride. Hence, if program execution is determined to flow into the PC range indicated by a given entry 352 of the stride address predictor then the prefetcher 40 could prefetch data from addresses which follow on from the address of the current load, with target addresses being obtained by adding the stride to the last accessed address each time. In some cases the stride prefetcher may also specify a predicted number of iterations for which subsequent addresses should be prefetched based on the stride or a target address range within which the stride pattern should be predicted. It will be appreciated that the fields shown in FIG. 12 are just one example of how a stride predictor could be implemented.

As shown in the bottom of FIG. 12 the corresponding allocation filter 314 may have entries which indicate certain information about entries which are prohibited from being allocated into the stride address prediction structure 300. For example each entry of the allocation filter may identify one or more of: a prohibited instruction address region (corresponding to the load PC address range shown for the stride address predictor) for which no entry should be allocated into the stride address predictor; certain prohibited target address regions so that if there are load instructions with target addresses within a certain region of the address space then no entries should be allocated into the stride address predictor in response to those load instructions; or prohibited stride offsets so that no entry is allocated into the stride address prediction structure 300 which specifies the prohibited stride offset. For example, it could previously have been predicted that a stride offset of a certain value (e.g. 3) does not predict well and fails to reach sufficient confidence in the prediction, and by preventing an entry being allocated for predicting such an offset in future this can preserve the entries of the stride address prediction structure 300 for other stride offsets which may be more successful in their training.

Hence, by using the allocation filter to filter the allocations into the stride address predictor based on information derived from previous attempts at training which failed, this enables more efficient use of the storage available in a stride address predictor or allows for total number entries in the stride address predictor to be reduced for a given prediction success rate.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
a prediction storage structure comprising a plurality of prediction state entries representing instances of predicted instruction behavior;
prediction training circuitry to perform a training operation to train the prediction state entries based on actual instruction behavior of instructions processed by processing circuitry;
prediction circuitry to output at least one control signal for triggering a speculative operation based on the predicted instruction behavior represented by a prediction state entry for which the training operation has provided sufficient confidence in the predicted instruction behavior;
an allocation filter comprising at least one allocation filter entry representing a failed predicted instruction behavior for which the training operation failed to provide said sufficient confidence; and
prediction allocation circuitry to prevent allocation of a new entry in the prediction storage structure for a predicted instruction behavior corresponding to a failed predicted instruction behavior represented by one of said at least one allocation filter entry of the allocation filter;
in which in response to identifying, in the actual instruction behavior, a candidate instruction behavior identified as a candidate for training, for which the candidate instruction behavior misses in both the prediction storage structure and the allocation filter, the prediction allocation circuitry is configured to allocate a new entry in the prediction storage structure for the candidate instruction behavior.

2. The apparatus according to claim 1, in which in response to eviction of a victim prediction state entry from the prediction storage structure, when the training operation for the victim prediction state entry failed to provide said sufficient confidence, the prediction allocation circuitry is configured to allocate a new allocation filter entry in the allocation filter corresponding to the predicted instruction behavior indicated by the victim prediction state entry.

3. The apparatus according to claim 1, in which the prediction training circuitry is configured to set a prediction unreliable indication for a given prediction state entry when the training operation identifies that the predicted instruction behavior for the given prediction state entry is unreliable.

4. The apparatus according to claim 3, in which in response to eviction of a victim prediction state entry from the prediction storage structure, when the prediction unreliable indication is set for the victim prediction state entry, the prediction allocation circuitry is configured to allocate a new allocation filter entry in the allocation filter corresponding to the predicted instruction behavior indicated by the victim prediction state entry.

5. The apparatus according to claim 1, in which the prediction allocation circuitry is configured to evict a given allocation filter entry from the allocation filter when the given allocation filter entry meets a retry condition.

6. The apparatus according to claim 5, in which the prediction training circuitry is configured to perform the training operation to train the failed predicted instruction behavior represented by said at least one allocation filter entry, based on the actual instruction behavior; and the retry condition comprises a confidence in the failed predicted instruction behavior represented by the given allocation filter entry exceeding a retry threshold.

7. The apparatus according to claim 1, in which a number of allocation filter entries provided in the allocation filter is greater than a number of prediction state entries provided in the prediction storage structure.

8. The apparatus according to claim 1, in which the predicted instruction behavior comprises a branch behavior of a branch instruction.

9. The apparatus according to claim 1, in which the predicted instruction behavior comprises a prediction of how many iterations of a program loop will execute before a loop controlling branch instruction terminates the program loop.

10. The apparatus according to claim 9, comprising a branch direction predictor to predict whether a conditional branch instruction should be taken or not-taken; in which:
the prediction allocation circuitry is configured to identify, as a candidate instruction behavior for allocation to the prediction storage structure, an instruction behavior of a mispredicted branch instruction for which the branch direction predictor provided an incorrect prediction.

11. The apparatus according to claim 1, in which the predicted instruction behavior comprises a prediction of one or more addresses expected to be accessed in future memory accesses, and the speculative operation comprises prefetching of data from the predicted one or more addresses into a cache.

12. The apparatus according to claim 11, in which said one or more addresses comprise addresses predicted based on a predicted stride offset between addresses of successive memory accesses.

13. The apparatus according to claim 11, in which each allocation filter entry specifies at least one of:
a prohibited instruction address region comprising one or more addresses, for which the prediction allocation circuitry is configured to prohibit allocation of a new entry in the prediction storage structure in response to a load/store instruction having an instruction address in the prohibited instruction address region;
a prohibited target address region comprising one or more addresses, for which the prediction allocation circuitry is configured to prohibit allocation of a new entry in the prediction storage structure in response to a load/store instruction specifying a target address in the prohibited load instruction address region; and
a stride offset which is prohibited from being allocated an entry in the prediction storage structure.

14. An apparatus comprising:
a prediction storage structure comprising a plurality of prediction state entries representing instances of predicted instruction behavior;
prediction training circuitry to perform a training operation to train the prediction state entries based on actual instruction behavior of instructions processed by processing circuitry;
prediction circuitry to output at least one control signal for triggering a speculative operation based on the predicted instruction behavior represented by a prediction state entry for which the training operation has provided sufficient confidence in the predicted instruction behavior;
an allocation filter comprising at least one allocation filter entry representing a failed predicted instruction behavior for which the training operation failed to provide said sufficient confidence; and prediction allocation circuitry to prevent allocation of a new entry in the prediction storage structure for a predicted instruction behavior corresponding to a failed predicted instruction behavior represented by one of said at least one allocation filter entry of the allocation filter, in which the prediction allocation circuitry is configured to evict a given allocation filter entry from the allocation filter when the given allocation filter entry meets a retry condition, in which the retry condition comprises elapse of a predetermined period since the given allocation filter entry was allocated to the allocation filter or since a previous retry condition;

said predetermined period comprising at least one of:
- a predetermined amount of time;
- a predetermined number of lookups to the allocation filter; or
- a predetermined number of lookups to the allocation filter which hit in said given allocation filter entry.

15. An apparatus comprising:

a prediction storage structure comprising a plurality of prediction state entries representing instances of predicted instruction behavior;

prediction training circuitry to perform a training operation to train the prediction state entries based on actual instruction behavior of instructions processed by processing circuitry;

prediction circuitry to output at least one control signal for triggering a speculative operation based on the predicted instruction behavior represented by a prediction state entry for which the training operation has provided sufficient confidence in the predicted instruction behavior;

an allocation filter comprising at least one allocation filter entry representing a failed predicted instruction behavior for which the training operation failed to provide said sufficient confidence; and prediction allocation circuitry to prevent allocation of a new entry in the prediction storage structure for a predicted instruction behavior corresponding to a failed predicted instruction behavior represented by one of said at least one allocation filter entry of the allocation filter;

wherein when a new entry is allocated to the prediction storage structure, the prediction allocation circuitry is configured to allocate the new entry initially specifying that the training operation has not yet provided sufficient confidence in the predicted instruction behavior.

* * * * *